(12) United States Patent
Franz et al.

(10) Patent No.: US 10,134,128 B2
(45) Date of Patent: Nov. 20, 2018

(54) DEVICE, METHOD AND COMPUTER PROGRAM FOR DETECTING OPTICAL IMAGE DATA OF A PATIENT POSITIONING DEVICE

(71) Applicant: Drägerwerk AG & Co. KGaA, Lübeck (DE)

(72) Inventors: Frank Franz, Stockelsdorf (DE); Stefan Schlichting, Lübeck (DE); Jasper Diesel, Lübeck (DE)

(73) Assignee: Drägerwerk AG & Co. KGaA, Lübeck (DE)

( * ) Notice: Subject to any disclaimer, the term of this patent is extended or adjusted under 35 U.S.C. 154(b) by 0 days.

(21) Appl. No.: 15/288,256

(22) Filed: Oct. 7, 2016

(65) Prior Publication Data

US 2017/0103524 A1    Apr. 13, 2017

(30) Foreign Application Priority Data

Oct. 9, 2015  (DE) .................. 10 2015 013 031

(51) Int. Cl.
*G06K 9/00* (2006.01)
*G06T 7/00* (2017.01)
*G06T 7/73* (2017.01)

(52) U.S. Cl.
CPC .............. *G06T 7/0012* (2013.01); *G06T 7/73* (2017.01); *G06T 2200/04* (2013.01); *G06T 2207/10004* (2013.01); *G06T 2207/10028* (2013.01); *G06T 2207/20061* (2013.01)

(58) Field of Classification Search
None
See application file for complete search history.

(56) References Cited

U.S. PATENT DOCUMENTS

| 6,049,281 | A | 4/2000 | Osterweil | |
| 2008/0122869 | A1* | 5/2008 | Aratani | G01C 11/04 345/633 |
| 2009/0119843 | A1 | 5/2009 | Rodgers et al. | |
| 2014/0299775 | A1* | 10/2014 | Kimmel | G06K 9/00771 250/341.8 |

(Continued)

FOREIGN PATENT DOCUMENTS

| DE | 34 26 444 A1 | 7/1985 |
| DE | 10 2004 021 972 A1 | 12/2005 |
| DE | 10 2014 100 548 A1 | 7/2015 |

OTHER PUBLICATIONS

Besl, P. J. (1992), "A Method for Registration of 3-D Shapes" in: Robotics DL tentative (pp. 586-606).

(Continued)

*Primary Examiner* — Stephen P Coleman
(74) *Attorney, Agent, or Firm* — McGlew and Tuttle, P.C.

(57) ABSTRACT

A device (10), a method and a computer program detect an optical image and generate optical image data of a patient positioning device (20). The device (10) is configured to detect optical image and generate optical image data of a patient positioning device (20) and to determine the position of at least two partial segments (20a; 20b; 20c; 20d) of the patient positioning device (20) on the basis of the image data. The device (10) has, further, an interface (16) for outputting information on the position of the at least two partial segments (20a; 20b; 20c; 20d).

18 Claims, 16 Drawing Sheets

(56) References Cited

U.S. PATENT DOCUMENTS

2015/0293600 A1* 10/2015 Sears .................. G06F 3/017
                                                                 345/156

OTHER PUBLICATIONS

Fischler, M. A. (1981), "Random Sample Consensus: A Paradigm for Model Filling with Applications to Image Analysis and Automated Cartography" Communications of the ACM, pp. 381-395.

Hartman, F. (2011): "Robot control by gestures" Thesis for Master's Degree, University of Lübeck.

Kong, T. & Rosenfeld, A. (1996), "Topological Algorithms for Digital Image Processing," Elsevier Science, Inc.

Shapiro, L. & Stockman, G. (2001), "Computer Vision," Prentice-Hall.

Viola, Paul and Michael J. Jones, "Rapid Object Detection Using a Boosted Cascade of Simple Features," Proceedings of the 2001 IEEE Computer Society Conference on Computer Vision and Pattern Recognition, 2001, vol. 1, pp. 511-518.

Gottschalk, Stefan, "Collision Queries using Oriented Bounding Boxes." Diss. The University of North Carolina at Chapel Hill, 2000.

O'Rourke, J., 1985. "Finding Minimal Enclosing Boxes." International Journal of Computer & Information Sciences, 14, 183-199.

Lahanas, M., Kemmerer, T., Milickovic, N., Karouzakis, K., Baltas, D., and Zamboglou, N. 2000. "Optimized bounding boxes for three-dimensional treatment planning in brachytherapy." Medical Physics, 27, 10, 2333-2342.

Barber, C. B., D. P. Dobkin, and H. T. Huhdanpaa, "The Quickhull Algorithm for Convex Hulls," ACM Transactions on Mathematical Software, vol. 22, No. 4, Dec. 1996, pp. 469-483.

Kirkpatrick, David G.; Seidel, Raimund (1986). "The Ultimate Planar Convex Hull Algorithm." SIAM Journal on Computing, 15 (1): 287-299.

Graham, R. L. (1972). "An Efficient Algorith for Determining the Convex Hull of a Finite Planar Set." Information Processing Letters, 1, 132-133.

Jolliffe, I. T. "Principal Component Analysis, Second Edition." Springer, 2002.

Halko, Nathan, et al. "An Algorithm for the Principal Component Analysis of Large Data Sets." SIAM Journal on Scientific Computing, 33.5 (2011): 2580-2594.

Roweis, Sam. "EM Algorithms for PCA and SPCA." Advances in neural information processing systems (1998): 626-632.

* cited by examiner

DEVICE, METHOD AND COMPUTER PROGRAM FOR DETECTING OPTICAL IMAGE DATA OF A PATIENT POSITIONING DEVICE

CROSS REFERENCE TO RELATED APPLICATIONS

This application claims the benefit of priority under 35 U.S.C. § 119 of German Application 10 2015 013 031.5 filed Oct. 9, 2015 the entire contents of which are incorporated herein by reference.

FIELD OF THE INVENTION

The present invention relates to exemplary embodiments that pertain to a device, to a method and to a computer program for detecting an optical image and generating optical image data of a patient positioning device, especially but not exclusively to an automated determination of a geometric position of partial segments of a patient positioning device based on such optical image data.

BACKGROUND OF THE INVENTION

Various concepts are known in the prior art, which estimate the position, posture or reclining position or position/pose of a patient on a hospital bed, motivated, for example, by the existence of unfavorable postures, which may adversely affect a healing or recovery process or represent a health risk. This may also include the patient remaining in a position or posture over a certain time period. For a patient confined to a hospital bed, his/her posture or pose depends on a setting or configuration of the hospital bed being used. Such patients are often in situations, for example, in accommodations intended for these situations, wards or hospital rooms in which corresponding monitoring, documentation and warning mechanisms are provided in order to avoid critical or incorrect postures. Some of the examples are facilities for assisted living, care facilities, home care spaces, old-age (senior) homes, hospitals and intensive care units.

In the area of care, there are adjustable or configurable hospital or care beds, which are available for patients at home or also in corresponding facilities such as hospitals. The available hospital beds are usually unable to make information available on a current configuration or use manufacturer-specific or own protocols for this.

Further background information can be found in the following documents:
- Besl, P. J. (1992), "Method for registration of 3-D shapes," in: Robotics DL tentative (pp. 586-606),
- Fischler, M. A. (1981), "Random sample consensus: A paradigm for model fitting with applications to image analysis and automated cartography," Communications of the ACM, pp. 381-395,
- Hartman, F. (2011): "Robot control by gestures," Thesis for Master's Degree, University of Lübeck,
- Kong, T. & Rosenfeld, A. (1996), "Topological Algorithms for Digital Image Processing," Elsevier Science, Inc.,
- Shapiro, L. & Stockman, G. (2001), "Computer Vision," Prentice-Hall,
- DE 10 2014 100 548 A1 pertains to an ergonomic system for an adjustable bed system. Detected image data are compared with an image data bank in order to determine position and posture data of a patient,
- DE 10 2004 021 972 A1 describes a patient bed, which is divided into partial areas and whose partial areas can be positioned, for example, by a plurality of vertically adjustable elements arranged in a matrix-like manner,
- DE 34 26 444 A1 discloses a method for positioning a patient, for example, for irradiation. Image data are compared here with reference image data in order to create reproducible patient positions,
- US 2009/0119843 A1 pertains to the observation of patient motions with cameras, and
- U.S. Pat. No. 6,049,281 pertains to the monitoring of patients with a camera.

SUMMARY OF THE INVENTION

Therefore, there is a need for creating an improved device and method for monitoring the position of a patient. This is accomplished by optical image of the patient positioning device being detected to generate optical image data, by the position of at least two partial segments of the patient positioning device being, further, determined based on the image data, and by information on the position of the at least two partial segments being, further, outputted. The position of the patient can be inferred from the position of the partial segments. For example, an increased probability that the patient's position has not changed can be inferred, for example, from a non-changing position of the partial segments. Positions of the segments may limit, for example, the possible positions of a patient or permit only certain positions. The outputted information concerning the position of the at least two partial segments can then be used and interpreted later as indirect information on the position or reclining position of the patient.

The proposed solution is advantageous especially because the position of the patient can be inferred in a simple manner from the position of the at least two partial segments. The outputted information can therefore preferably be a data set that indicates only the positions of the at least two partial segments and therefore possibly has a markedly smaller data volume than data information that indicates a complete position of an entire patient with all his/her individual body segments. More efficient documentation of the patient's position can be achieved by storing the information with such a smaller or reduced data volume of said outputted information. Further, efficient data transmission of the outputted information can take place, because it is not necessary to transmit information on the positions of all possible body segments of the patient but only the outputted information concerning the partial segments of the patient positioning device. As was already mentioned above, this can then be interpreted or stored as indirect information on the patient's position after the transmission. Further, a determination of the partial positions of the partial segments of the patient positioning device can sometimes be carried out with more certainty and more reliably than a determination of partial positions of respective body parts or body segments of the patient.

In other words, exemplary embodiments of the present invention are also based on the idea of analyzing and processing optically detected image data of a patient positioning device and of inferring from this the position of at least two partial segments. Exemplary embodiments provide a device for detecting optical image data of a patient positioning device and for determining a position of at least two partial segments of the patient positioning device based on the image data. Some exemplary embodiments can thus make possible the optical determination of the position of a patient positioning device, which can avoid a communication directly with the patient positioning device and any communication components and communication protocols that may be necessary for this as well as detection devices at the patient positioning device, such as feedbacks on regulation ratios. The device has, furthermore, an interface for outputting information on the position of the at least two partial segments. Exemplary embodiment can thus provide information on the position of the partial segments for further processing (e.g., in a computer) or also for display (e.g., on a monitor or display element (also called display in English)).

In some exemplary embodiments, the device comprises a detection device for detecting the optical image data of the patient positioning device, wherein the detection device has one or more sensors. One or more image sensors may be used here and thus make possible in some exemplary embodiments the use of one or more cameras, whose optical detection also detects the patient positioning device. The one or more sensors may comprise in further exemplary embodiments at least one sensor, which delivers at least three-dimensional data. The image data may then also comprise, in addition to other information, depth information, which makes possible a more accurate determination of the position of the at least two partial segments. The one or more sensors may be configured, for example, to detect a set of pixels as image data, wherein the set of pixels is essentially independent from an illumination intensity of the patient positioning device, wherein the illumination intensity is based on an effect of external light sources. The light sources are external in the sense that they are not part of the device. This can make it possible to determine the position of the partial segments independently from the time of day and the external illumination conditions.

In some exemplary embodiments, the device may have, further, a determination device, which is configured to determine the position of the at least two partial segments of the patient positioning device based on the image data. The determination device may permit, for example, the use of one or more processors, graphics processors, computers, microcontrollers, etc. In some other exemplary embodiments, the determination device may be configured to transform the image data or preprocessed image data from an original area into a transformation area. The determination of the position of the partial segments in the transformation area can be more robust with respect to interfering objects in the image data than in the original area. Depending on the type of the interfering objects, it is thus possible to select a transformation area that permits a more rapid or more reliable determination of the position of the partial segments. The determination device may be configured to quantify the at least two partial segments in the transformation area in terms of position and size. A determination according to position and size can contribute to a more rapid, more accurate and/or less complicated determination of the position of the partial segments.

The determination device may be configured in some further exemplary embodiments for determining information on the reliability of a position determination for at least one partial segment. Some exemplary embodiments can thus permit a reliability estimation and possibly discard unreliable position estimates or determinations and allow a lower effect for the overall estimate. The information on the position can be outputted in some exemplary embodiments as a function of a condition. There can thus be a possibility of communication or interaction. The condition may be selected, for example, such that the output takes place periodically, on request, in an event-based manner or at random. Many monitoring, documentation and/or warning implementations are thus conceivable in the exemplary embodiments. The conditioned output is advantageous, because it possibly results in a data reduction, because it is not necessary to steadily output data for indicating the outputted information, but superfluous data volumes can be avoided, because information is only outputted upon onset of the condition.

It is also possible in some exemplary embodiments that the interface is configured, further, for outputting position information and/or size information on the at least two partial segments. and further information can thus be provided for further processing or display.

The detection device may comprise in some exemplary embodiments a plurality of image sensors for detecting at least three-dimensional image data. The determination device may be configured to combine the data of the plurality of image sensors into image data of an at least three-dimensional partial image of the patient positioning device and to carry out the determination of the position of the at least two partial segments on the partial image. Some exemplary embodiments can thus permit the use of a plurality of sensors or cameras and generate a more detailed three-dimensional (partial) image, for example, by recordings from different perspectives and combination of the individual image data. The determination device may be configured in some other exemplary embodiments to determine two-dimensional histogram data from at least three-dimensional partial image data of the patient positioning device and to determine the position of the at least two partial segments of the patient positioning device based on the histogram data. Exemplary embodiments can thus provide an effective image and/or data processing to determine the position of the partial segments.

The determination device may be configured in some exemplary embodiments to determine pixels, which contain image information on the patient positioning device, from the at least three-dimensional partial image data of the patient positioning device, to weight the pixels as a function of a distance from a central plane along a longitudinal axis of the patient positioning device, and to determine the histogram data on the basis of the weighted pixels. Some exemplary embodiments can thus achieve a more reliable determination of the position of the partial segments, because pixels, which are assigned to a center of the patient positioning device and thus probably also to interfering objects, will receive a lower weighting.

Further, exemplary embodiments create a method for determining the position of at least two partial segments of a patient positioning device, with optical detection of an image to provide optical image data of the patient positioning device and with determination of the position of the at least two partial segments of the patient positioning device based on the optically detected image data. The method comprises, furthermore, the outputting of information on the position of the at least two partial segments.

Another exemplary embodiment is a computer program for carrying out at least one of the above-described methods when the computer program is run on a computer, a processor or a programmable hardware component. Another exemplary embodiment is also a digital storage medium, which is machine-readable or computer-readable and which has electronically readable control signals, which can interact with a programmable hardware component such that one of the above-described methods is carried out.

Further advantageous embodiments will be described in more detail below on the basis of the exemplary embodiments shown in the drawings, even though the present invention is not generally limited as a whole to these exemplary embodiments.

The present invention is described in detail below with reference to the attached figures. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
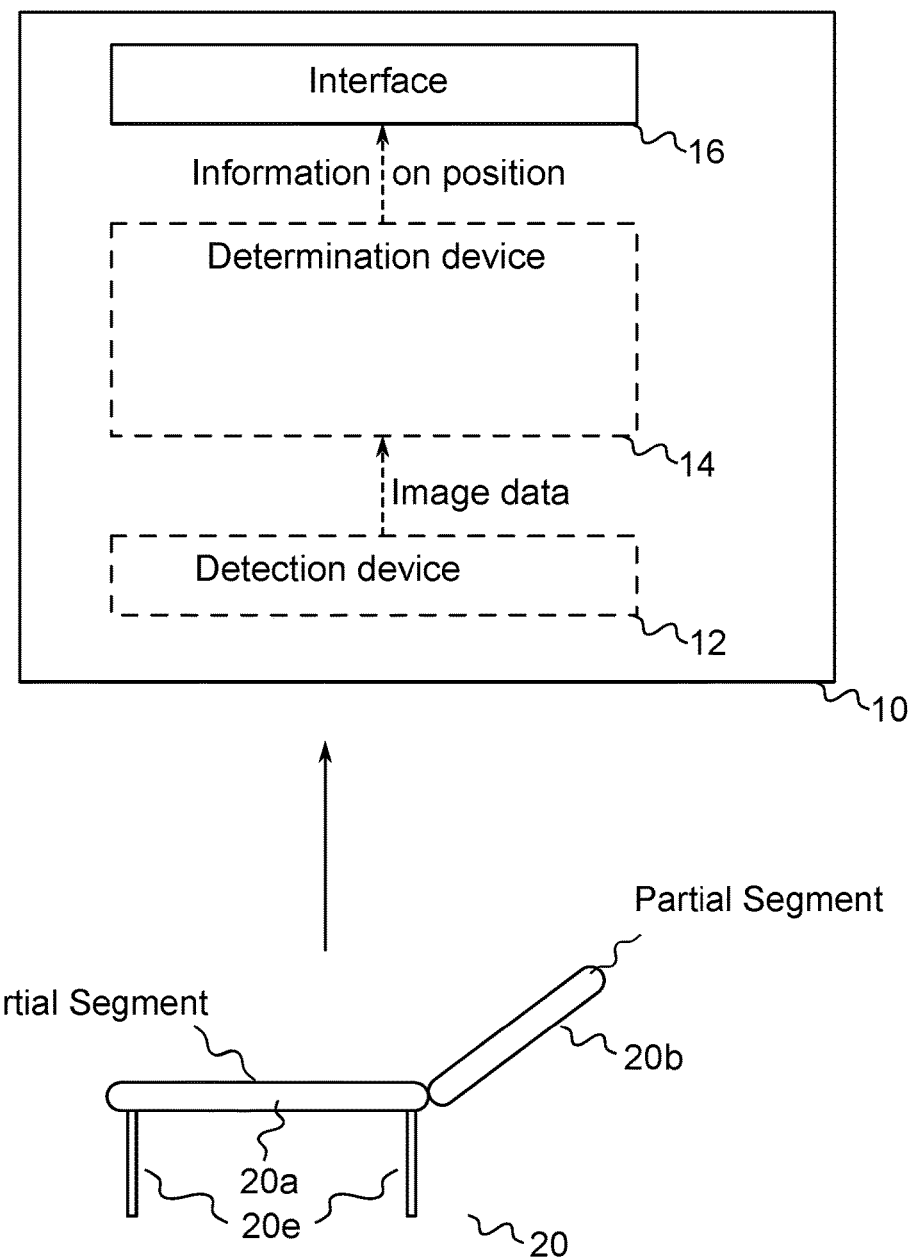
FIG. 1 is a schematic view showing an exemplary embodiment of a device for detecting optical image data of a patient positioning device and showing a patient positioning device.

Referring to the drawings, various exemplary embodiments will now be described in more detail with reference to the attached drawings, in which some exemplary embodiments are shown.

In the following description of the attached figures, which show only some exemplary embodiments, identical reference numbers may designate identical or comparable components. Further, summary reference numbers may be used for components and objects that occur as multiple components and objects in one exemplary embodiment or in one drawing, but are described jointly with respect to one or more features. Components or objects that are described with the same or summary reference numbers may have identical, but optionally also different configurations concerning individual, several or all features, for example, their dimensioning, unless something different explicitly appears from the description. Optional components are indicated by broken lines or arrows in the figures.

Even though exemplary embodiments may be modified and changed in different ways, exemplary embodiments are shown in the figures as examples and are described here in detail. It is, however, clarified that exemplary embodiments are not intended to be limited to respective disclosed forms, but exemplary embodiments shall rather cover all functional and/or structural modifications, equivalents and alternatives that are within the scope of the present invention. Identical reference numbers designate identical or similar elements in the entire description of the figures.

It should be noted that an element that is described as being "connected" or "coupled" with another element may be directly connected or coupled with the other element and that elements located in between may be present. If, by contrast, an element is described as being "directly connected" or "directly coupled" with another element, no elements located in between are present. Other terms, which are used to describe the relationship between elements should be interpreted in a similar manner (e.g., "between" versus "directly in between," "adjoining" versus "directly adjoining," etc.).

The terminology being used here is used only to describe certain exemplary embodiments and shall not limit the exemplary embodiments.

Unless defined otherwise, all the terms being used herein (including technical and scientific terms) have the same meaning, which an average person skilled in the art to which the exemplary embodiments belong attributes to them. Further, it shall be clarified that terms, e.g., those that are defined in a generally used dictionary, are to be interpreted such as if they had the meaning that is consistent with their meaning in the context of the relevant technical area and are not to be interpreted in an idealized or excessively formal sense, unless this is expressly defined here.

FIG. 1 shows an exemplary embodiment of a device 10 for detecting optical image data—providing optical image data based on a sensed or detected optical image—of a patient positioning device 20 and for determining a position of at least two partial segments 20a, 20b of the patient positioning device 20 based on the image data. The patient positioning device 20 may also have additional segments in exemplary embodiments. Here and below, a patient positioning device 20 shall be defined, for example, as an adjustable hospital bed, an operating table, a reclining surface, a stretcher, a sluice table, a wheelchair, etc., i.e., a device that is suitable for positioning, bedding, supporting, possibly transporting, etc., persons, patients or persons in need of care. Some exemplary embodiments will be examined below based on the example of a hospital bed. This hospital bed is thought and considered to be representative of any patient positioning devices.

Figure 2:
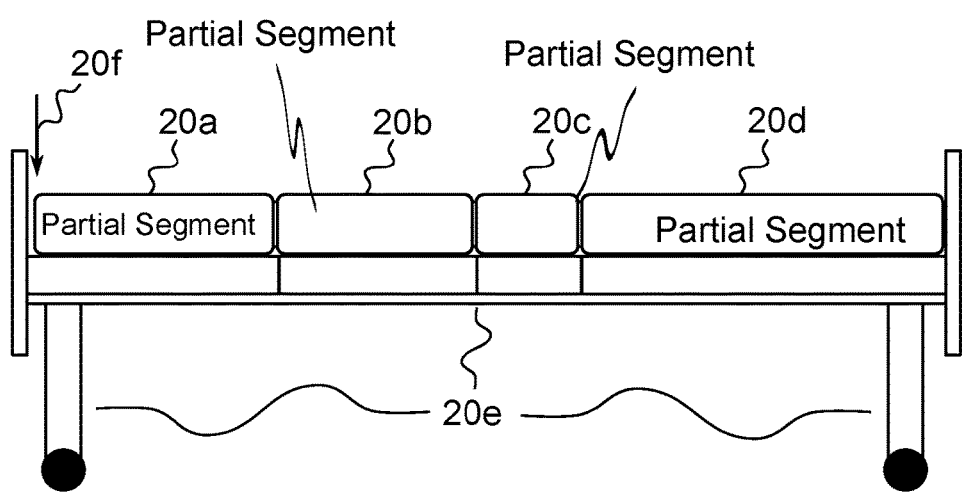
FIG. 2 is a schematic view showing a hospital bed as a patient positioning device with four segments in one exemplary embodiment.

FIG. 2 shows a hospital bed generally designated 20 with four segments 20a, 20b, 20c, 20d in one exemplary embodiment. The segments may be intended for different functions, for example, for supporting a foot, leg, trunk, back, head, etc., and may be divided into areas, e.g., sitting area and reclining area. The partial segments 20a, 20b, 20c, 20d in FIG. 2 are assigned at least partly to segments of a reclining and/or sitting area of the patient positioning device 20. Any other patient positioning device with corresponding segments may also be considered instead of the hospital bed 20 in further exemplary embodiments. The partial segments 20a, 20b, 20c, 20d may be configurable or adjustable and therefore assume different positions in relation to one another or also relative to the bed frame 20e, cf. FIG. 1. In the exemplary embodiment shown, the mattress of the bed 20 is divided into the four segments 20a, 20b, 20c, 20d, which are configurable. A patient can thus lie on the bed 20, for example, with his head to the right, so that the partial segment 20a supports the lower leg area of the patient, the partial segment 20b the upper leg area, etc. An arrow 20f marks the beginning of segment 20a in FIG. 2. The position of a segment 20a, 20b, 20c, 20d is here and hereinafter defined as the orientation, direction, relative orientation of said segment in relation to at least one other partial segment, e.g., the angle of intersection of the longitudinal and transverse axes, relative orientation in relation to a reference object, e.g., subfloor, axis of the patient positioning device, information that informs the health care staff on whether a setting of the patient positioning device shall be changed in the given state of the patient located thereon, etc. The determination of information on the position is consequently performed with the goal of obtaining information on the setting or configuration of the patient positioning device 20 in order to then make it possible, for example, to document this and/or to also assess whether a change should be made in the setting. The position of the at least two partial segments 20a, 20b can thus pertain to any one-, two- or three-dimensional information that makes it possible to infer the setting or configuration of the at least two partial segments 20a, 20b, e.g., in the form of angles, straight lines, planes, etc.

Figure 3:
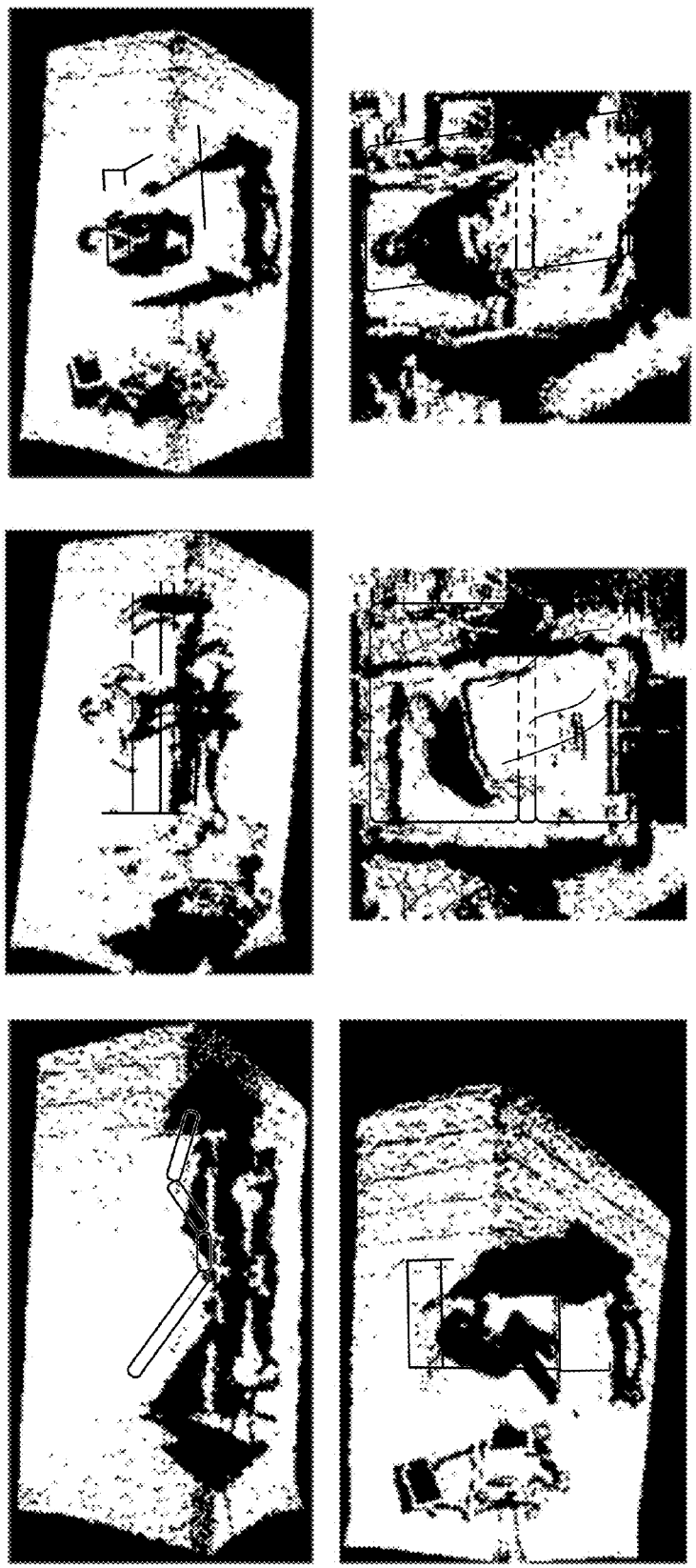
FIG. 3 is a view showing various positions of partial segments of a hospital bed as a patient positioning device in one exemplary embodiment.

FIG. 3 shows different positions of partial segments 20a, 20b, 20c, 20d of the hospital bed 20 in exemplary embodiments, and different perspectives to the hospital bed 20 are, moreover, shown in FIG. 3. The configurations are exemplary configurations of an adjustable bed 20 in an intensive care unit with interfering objects in the image data.

The top left part of FIG. 3 shows a configuration from a lateral perspective, in which an angle is set between adjacent segments. The top center part shows a flat configuration, and a patient can also be seen in the central part of the picture. The top right part shows a patient sitting on a flatly configured bed, and the bottom left part shows a patient lying on the otherwise rather flatly configured bed, with both views being shown from a nearly frontal perspective. The two views at the bottom in the center and on the right show the bed with the patient with additional partial segment settings from frontal perspectives. As can be seen in the views shown in FIG. 3, the partial segment configurations may be greatly different, and patients or objects, such as blankets, pillows, etc., may partly hide the segments in the image and in the image data.

In the exemplary embodiment shown in FIG. 1, the device 10 comprises, further, an interface 16 for outputting information on the position of the at least two partial segments 20a, 20b. The interface 16 may be coupled with a determination device 14 explained below. For example, information on the configuration/position of the segments 20a, 20b (e.g., angle, angle of intersection, information derived therefrom, etc.) and/or information on the reliability of this information can be communicated via the interface 16 to other components, e.g., for subsequent further processing of the image data, for example, to a display or to a monitor, an alarm device or a documentation system.

The interface 16 may correspond, for example, to one or more inputs and/or to one or more outputs for receiving and/or transmitting information, e.g., in digital bit values, analog signals, magnetic fields, based on a code, within a module, between modules, or between modules of different entities. However, the interface 16 may also correspond to an input interface 16, such as a control panel, to a switch or rotary switch, to a button, to a touch-sensitive screen "also called "touchscreen" in English), etc. The interface 16 thus makes it possible to record, possibly also receive or enter information, for example, on whether a determination of the position of the partial segment should be performed.

In another exemplary embodiment, the device 10 comprises a detection device 12 for detecting the optical image data of the patient positioning device 20, as this is optionally shown in FIG. 1 (optional components are shown by broken lines in FIG. 1). The detection device 12 may have one or more sensors with a connection to the processor (determination device) 14 as an optical image data input to receive optical image data at the processor 14. The detection device 12 may correspond to any one or more optical detection units, detection devices, defection modules, etc. Cameras, image sensors, infrared sensors, sensors for detecting one-, two-, three- or more than three-dimensional data, many different sensor elements, etc., may form all or a part of the detection device 12. In additional exemplary embodiments, the one or more sensors may comprise at least one sensor that delivers at least three-dimensional data. The three-dimensional data consequently detect information on pixels in the room and may additionally comprise, quasi as additional dimensions, additional information, for example, color information (e.g., red, green, blue (RGB) color space), infrared intensity, transparency information (e.g., alpha values), etc.

There are various types of sensors which, though not generating a two-dimensional image of a scene, do generate a three-dimensional set of points, e.g., pixels with coordinates or different depth information, which comprise information on surface points of an object. For example, information may be present on a distance of the pixels from the sensor or sensor system itself.

Figure 4:
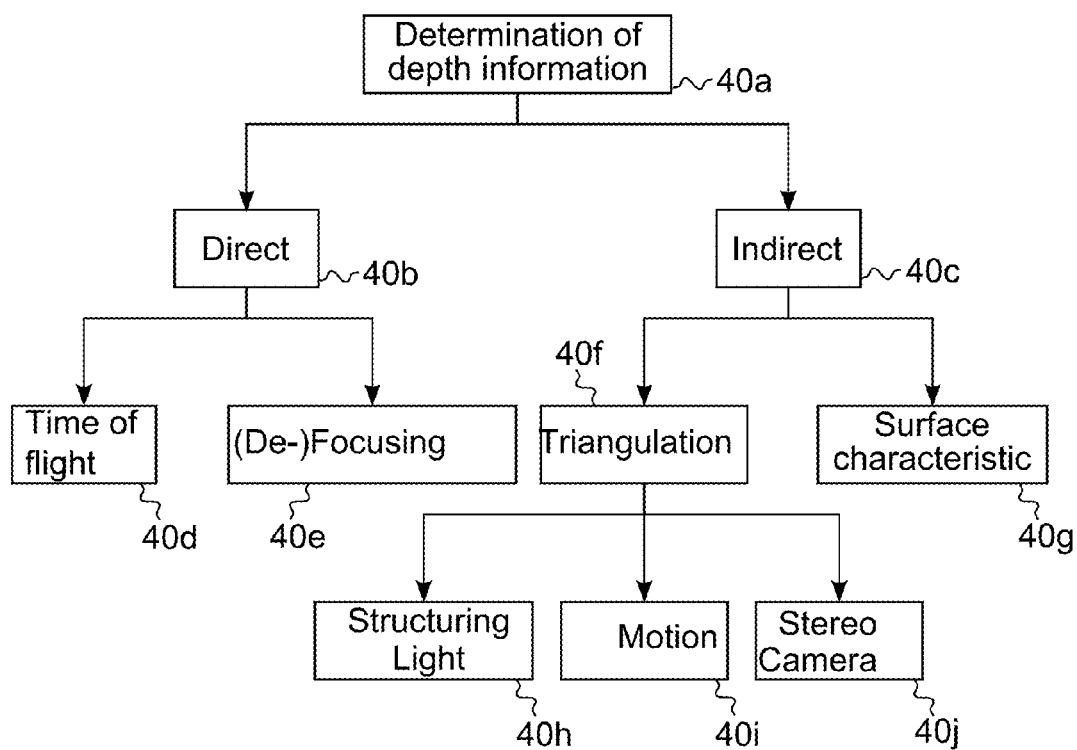
FIG. 4 is a general diagram view for determining three-dimensional image data in some exemplary embodiments.

FIG. 4 shows a general diagram of an algorithm for determining three-dimensional image data in some exemplary embodiments, and determination variants going beyond FIG. 4 may also be used in exemplary embodiments. It should be noted that the three-dimensional image data, to which reference is being made, often correspond to a three-dimensional partial image only, because a sensor only determines pixels from a certain perspective and an incomplete three-dimensional image can thus develop. As will be explained in the further course, a plurality of such partial images may also be combined in order to obtain an image with improved quality or more pixels, which can, in turn, also correspond to a partial image only.

FIG. 4 shows at block 40a the determination or calculation of depth information present in the image data. Direct methods can be differentiated here in branch 40b and indirect methods in branch 40c, the direct methods determine a distance of a point from the system directly via the system and the indirect methods require additional devices for determining the distance. Direct methods are, for example, time of flight measurements (also called "time of flight" in English) 40d and (de)focusing methods 40e. Indirect methods comprise, for example, triangulation 40f (for example, by means of structured light 40*h*, motion 40*i* or stereo camera 40*j*) and analysis of object characteristics 40*g*.

Further details on the different possibilities can be found, for example, in Hartman F., 2011, see above. Such sensors have become more cost-effective than in the past, they have been improved further and their performance has increased. Three-dimensional information can enable a computer to perform corresponding analyses of the detected objects and to provide corresponding data.

As a result, exemplary embodiments can yield a data set that indicates partial positions of at least two partial segments 20*a*, 20*b*, 20*c*, 20*d* of a patient positioning device 20 as partial planes in the three-dimensional space. The partial planes may be indicated as two-dimensional partial planes in the three-dimensional space or as one-dimensional partial straight lines in the two-dimensional space in some exemplary embodiments. It can be assumed as higher knowledge in the partial straight line representation that the planes extend in the third dimension at right angles to the two-dimensional coordinates.

For example, a set of three-dimensional planes, which describe at least two segments 20*a*, 20*b*, 20*c*, 20*d*, can be specified in the three-dimensional case. One plane may be represented as a plane equation (e.g., Hesse normal form); one set can be determined with parameters for a plane equation per plane, e.g., in the Cartesian coordinate system with x, y, z, z is given by $z=a+bx+cy$. A plane may also be specified by a data set $(a_1, b_1, c_1)$ for a point $z_1$, which defines a point on the plane, as well as a normal vector extending at right angles to the plane, which can be defined by three parameter values (e.g., $x_1, y_1, z_1$). A plane may also be specified as a polygon with three quasi coplanar points in the 3D space, and each point can be described by a 3-tuple (x, y, z), because the three points (shall) lie on the same plane. As an alternative, a closed surface (closed or limited plane) can also be defined in the three-dimensional space by four quasi coplanar points. Consequently, three or more points in the three-dimensional space can indicate a two-dimensional plane. Moreover, line segments or straight line representations can be specified. In addition or as an alternative, four straight lines can also be described in the three-dimensional space by respective parameter sets (e.g., (a, b, c,) for the Hesse normal form) in order to describe a closed surface (closed or limited plane).

A set of straight lines, which describe at least two segments 20*a*, 20*b*, 20*c*, 20*d*, can be specified in the two-dimensional case. In addition or as an alternative, these can be described as sections (or closed or limited straight lines, half sections, lines, etc.) by at least two points, e.g., by two 2-tuples $(x_i, y_i)$. A straight line can, in general, be described as a linear equation by 2-tuple (a, b) for $y=ax+b$ and a section (closed or limited straight line) by 2-tuple (a, b) for $y=ax+b$ as well as additionally by a point $(y_i, x_i)$ and the length of the section $(L_i)$. A straight line can also be specified by a plotted point $(y_i, x_i)$ and an angle value, which indicates the angular position of the straight line, e.g., a section through a plotted point $(y_i, x_i)$ and an angle value, which indicates the angular position of the straight line.

Figure 13:
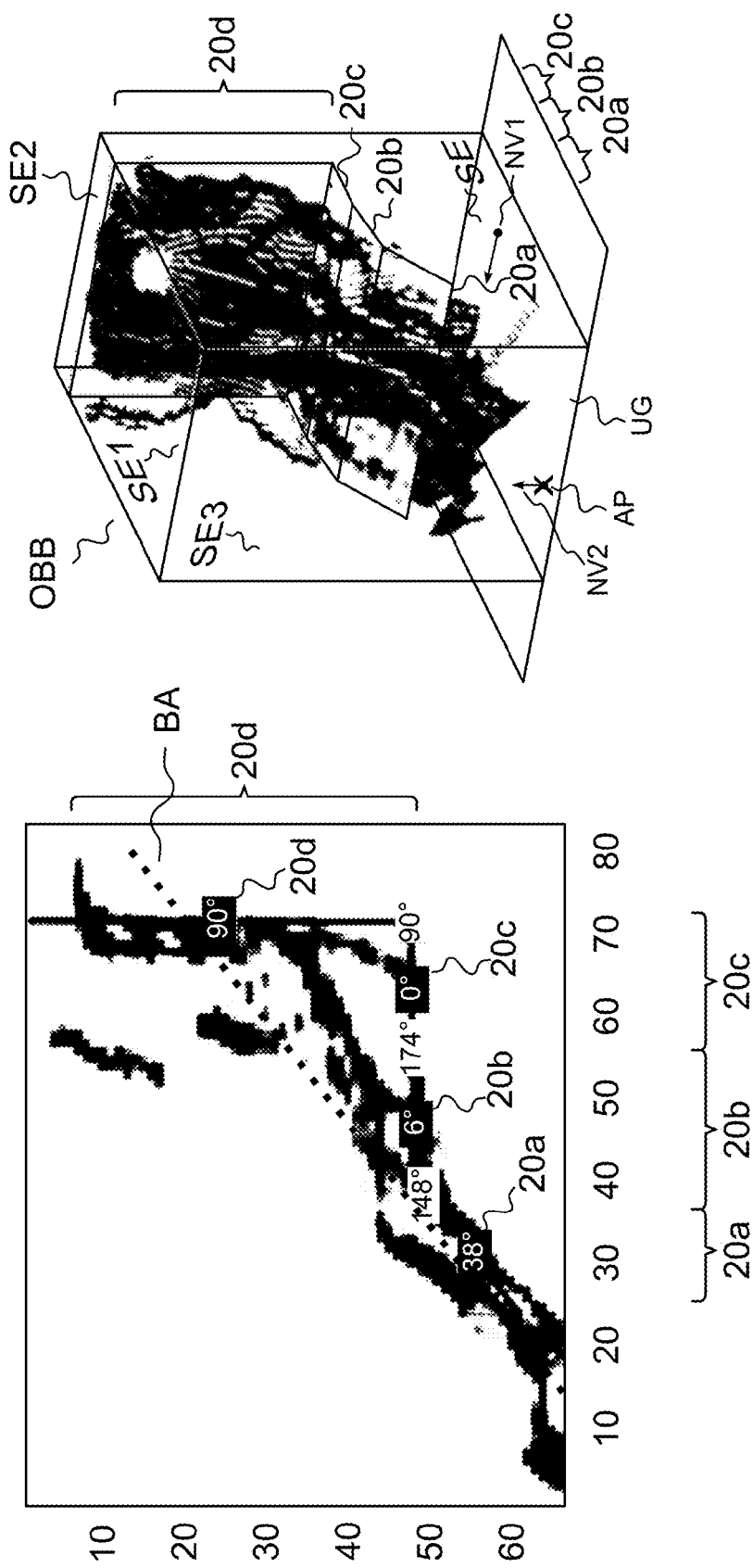
FIG. 13 is a view of event data in one exemplary embodiment.

In the two-dimensional or three-dimensional case, it is possible to use information that can be derived from the above-mentioned information, e.g., an angle of the partial planes in relation to one another (dihedral angle of the described planes, angle of intersection of the straight lines, represented as angle values on a white background in the left-hand part of FIG. 13). A critical position of a patient (e.g., exceeded angle value between two planes) can already be derived from such relative angles between the partial planes. The particular angle of the partial planes in the 2D plane (represented as angle values on a black background in the left-hand part of FIG. 13) would be more such information. Relative angles between the partial planes can be determined from such angles and a critical position of a patient (e.g., exceeded angle value between two planes) can then be derived here as well. A length information for a partial segment/of the partial plane is preferably also transmitted per angle of a partial plane. This length information can also be added as higher knowledge, because, e.g., the partial lengths of partial segments may be known (e.g., the "type of bed" is known).

Model fitting in a set of data points may be another method in the area of computer-aided detection. If relatively simply describable mathematical models are used, e.g., straight lines or planes, the RANSAC algorithm (from the English Random Sample Consensus, Fischler, 1981) is a known method. RANSAC fits a known model, which is described by a parameter set, to a fault-prone data set in a relatively stable manner providing that information on whether a data point is within or outside the model can be determined. ICP (from the English "Iterative Closest Point," Besl, 1992) is another method in case of more complex structures, which cannot be described in a simple manner, e.g., complete three-dimensional models. In principle, ICP fits a set of points of another set of points (reference or target set of point) by iterative distance minimization from point to point or from point to plane. The result is then a transformation matrix, which images the input set of points to the target set of points. Furthermore, combinations of RANSAC and ICP with one another as well as with other algorithms may be used. However, this method permits configurable partial segments 20*a*, 20*b*, 20*c*, 20*d*. A mathematical modeling is rather difficult in this case of the configurable partial segments and it is therefore also difficult to determine whether a point is within or outside the model. One exemplary embodiment uses a method tailored to a patient positioning device 20, which takes advantage of the characteristics of the device.

Some exemplary embodiments can determine the position of the partial segments 20*a*, 20*b*, 20*c*, 20*d*, even though interfering objects are present in the image data, for example, a person who is lying on the bed, pillows, blankets, etc. Some exemplary embodiments dispense with a communication or a communication channel between the patient positioning device 20 and the device 10. In another exemplary embodiment, the one or more sensors detect as image data a set of pixels, and the set of pixels is essentially independent from an illumination intensity of the patient positioning device 20 and the illumination intensity is based on the effect of external light sources. In some other exemplary embodiments, the device or sensors may comprise one or more illuminating devices of their own in the visible or invisible (e.g., infrared) range, which are configured for illuminating the patient positioning device 20. A certain independence from external light sources can be achieved hereby. A light source or even a window, etc., which affects the illumination intensity of the patient positioning device 20 and acts as an independent light source in this respect outside the device or the sensors shall be defined here as being external.

Exemplary embodiments can thus make it possible to document the different positions, the triggering of alarms or warnings, or also the display of the position of the segments from/in the distance, and this can happen in some exemplary embodiments under any illumination conditions, during the day or in the night, as well as under varying light conditions.

At least some exemplary embodiments can therefore permit or make possible a type of automated detection of the position of the partial segments 20a, 20b, 20c, 20d.

As is also shown in FIG. 1, the device 10 may comprise in another exemplary embodiment a determination device 14, which is configured to determine the position of the at least two partial segments 20a, 20b of the patient positioning device 20 based on the image data. The determination device 14 is coupled with the interface 16. The determination device 14 may correspond in exemplary embodiments to any controller or processor or a programmable hardware component. For example, the determination device 14 may also be embodied as software, which is programmed for a corresponding hardware component. Thus, the determination device 14 may be implemented as a programmable hardware with correspondingly adapted software. Any processor, such as digital signal processors (DSPs), may be used. Therefore, exemplary embodiments are not limited to a certain type of processor. Any processor or even a plurality of processors may be used for implementing the determination device 14. FIG. 1 illustrates, furthermore, that the determination device 14 is coupled with the detection device 12 in one exemplary embodiment. For example, the one or more sensors of the detection device 12 detect (sense) at least part of a three-dimensional image and provide at least three-dimensional (partial) image data in this exemplary embodiment and makes such data available to the determination device 14, which segments the patient positioning device 20 and potential objects thereon in the image data.

The determination device 14 is configured in this exemplary embodiment to transform the image data or also preprocessed image data (e.g., the histogram described below) from an original area into a transformation area, the determination of the position of the partial segments 20a, 20b, 20c, 20d being more robust in the transformation area with respect to interfering objects in the image data than in the original area. A set of transformed pixels (transformed data), which makes possible a determination of the partial segments in the three-dimensional image data by a quantification of the three-dimensional position and size of the individual segments 20a, 20b, 20c, 20d, is present in the transformation area. The determination device 14 is configured to quantify in the transformation area the at least two partial segments 20a, 20b, 20c, 20d in respect to position (e.g., absolute position in a coordinate system or relative position in relation to a reference point or object, relative positions of the segments relative to one another, etc.) and size. The determination device 14 is configured, furthermore, to determine information on the reliability of a position determination for at least one partial segment 20a, 20b, 20c, 20d. The reliability of the determined positions can then be assessed.

A confidence parameter or confidence parameters, which quantifies/quantify and/or also outputs/output the quality or the reliability of the determined segments 20a, 20b. 20c, 20d, can consequently optionally and/or additionally be determined in some exemplary embodiments. This information can be used to discard the data; e.g., a documentation of a "poor data set" is not performed, or the data set is not passed on to additional systems, or it is not displayed. As a result, false alarms can also be avoided in alarm systems. A data set can then be detected and generated once again, for example, later.

For example, the device 10 may be configured in some exemplary embodiments to output the information on the position as a function of a condition, the condition being able to have many different degrees of expression. For example, the condition may be selected such that the output is performed periodically, on request, in an event-based manner or at random. This may be performed internally by the determination device 14 or also externally, for example, by inputting or also by a trigger via the interface 16. The interface 16 may be configured, furthermore, for outputting position information and/or size information via the at least two partial segments 20a, 20b, 20c, 20d.

In some exemplary embodiments, only the output can be outputted as a function of the condition, but the determination can continue to be carried out continuously, cyclically, periodically, etc., independently from the condition. In other exemplary embodiments, the determination proper may also depend on the condition and be carried out correspondingly continuously, cyclically, periodically, in an event-based manner, in a trigger-based manner, in a request-based manner, etc.

The output may take place periodically in some exemplary embodiments, and the generation of the data set may also take place periodically (e.g., automatic documentation or for alarming or display). At least one configurable time interval may be provided for this in some exemplary embodiments. The output may be request-based in some exemplary embodiments, e.g., based on request from the outside. A documentation unit or a display could decide about the data polling and a reduced data rate could result in the transmission, because the configuration of the bed is detected/polled at certain times only. Only a current data set entered last is polled in some exemplary embodiments. A generation/determination may take place, for example, periodically or based on a request or an event. In other exemplary embodiments, the output may take place in an event-based manner. For example, an automatic detection that there could be a significant change in the configuration of the bed can take place, and a determination/output is triggered based on this. Further examples of such events are a change in the configuration of the bed, a significant change in at least one partial data set between two times judged from one or more threshold values for the respective parameters, a change in the incoming point cloud (e.g., due to a mean distance of at least a subset of the points for consecutive times), etc. The output can be triggered in some other exemplary embodiments by an internal (accident-based) trigger; for example, a pseudoperiodic generator may be used to generate the trigger.

Figure 5:
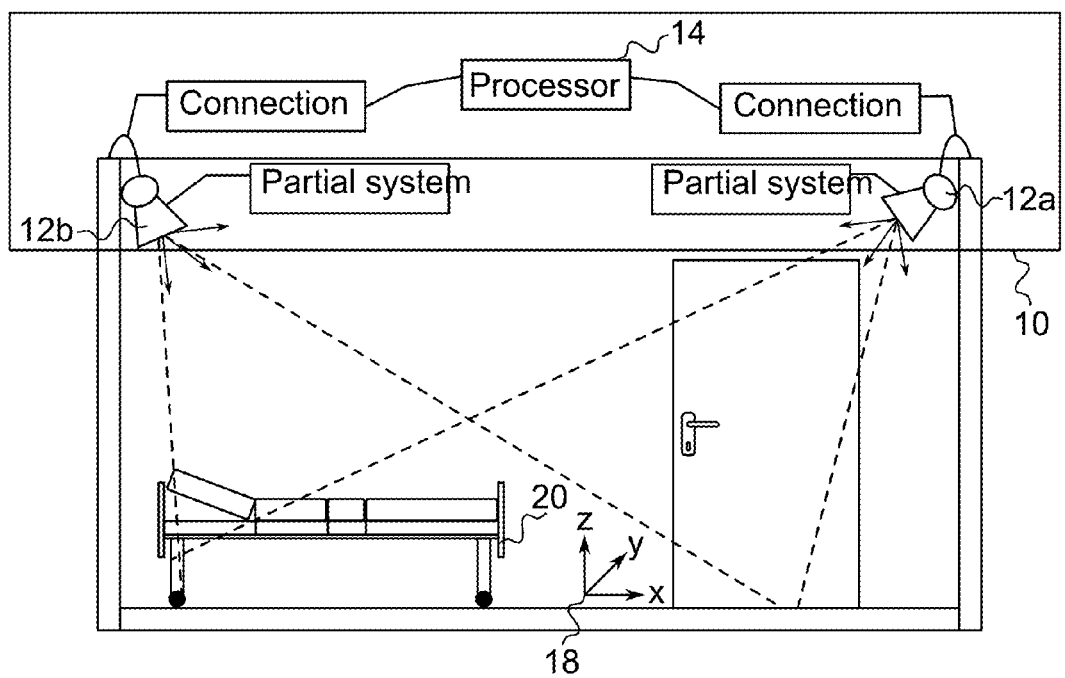
FIG. 5 is a schematic view showing an exemplary embodiment in a hospital room.

FIG. 5 shows an exemplary embodiment in a hospital room. The device 10 comprises here a detection device 12 with two partial systems 12a and 12b for detecting at least three-dimensional partial image data from different perspectives of the scene in the hospital room. FIG. 5 shows, moreover, a configurable hospital bed 20 (representative of a general patient positioning device 20) and a door. The two partial systems 12a and 12b of the detection device 12 are coupled with the determination device 14, which is implemented in this case as a processor unit 14, via a communication link, for example, Ethernet and Internet protocol (IP) and/or in a network.

The detection device 12 of the device 10 may generally comprise 1 . . . n sensors, which determine each a set of points, which can be added up or combined into a single three-dimensional (subset) of pixels. As is shown by the exemplary embodiment in FIG. 5, the detection device 12 may comprise a plurality of image sensors for detecting at least a three-dimensional partial image to form at least three-dimensional partial image data. The determination device 14 is then configured to combine the data of the plurality of image sensors into image data of an at least three-dimensional partial image of the patient positioning device (hospital bed here) 20 and to carry out the determination of the position of the at least two partial segments 20a, 20b, 20c, 20d based on the (combined) partial image. The combined image data contain, for example, information on the three-dimensional surface of the patient positioning device 20 from the angles of view of the sensors. By merging the data of a plurality of image sensors, a three-dimensional (partial) image of the hospital bed 20 to be imaged can be generated with a higher degree of detail than with an individual image.

The determination device 14, which is configured as a processor unit in the exemplary embodiment shown in FIG. 5, is connected to the 1 . . . n sensors via a network connection. The determination proper can then be carried out based on the merged data. The network, which can provide a communication connection, may also be used to forward information on a certain configuration of the bed, for example, for the purpose of documentation, monitoring or display (e.g., on a monitor or display).

Figure 6:
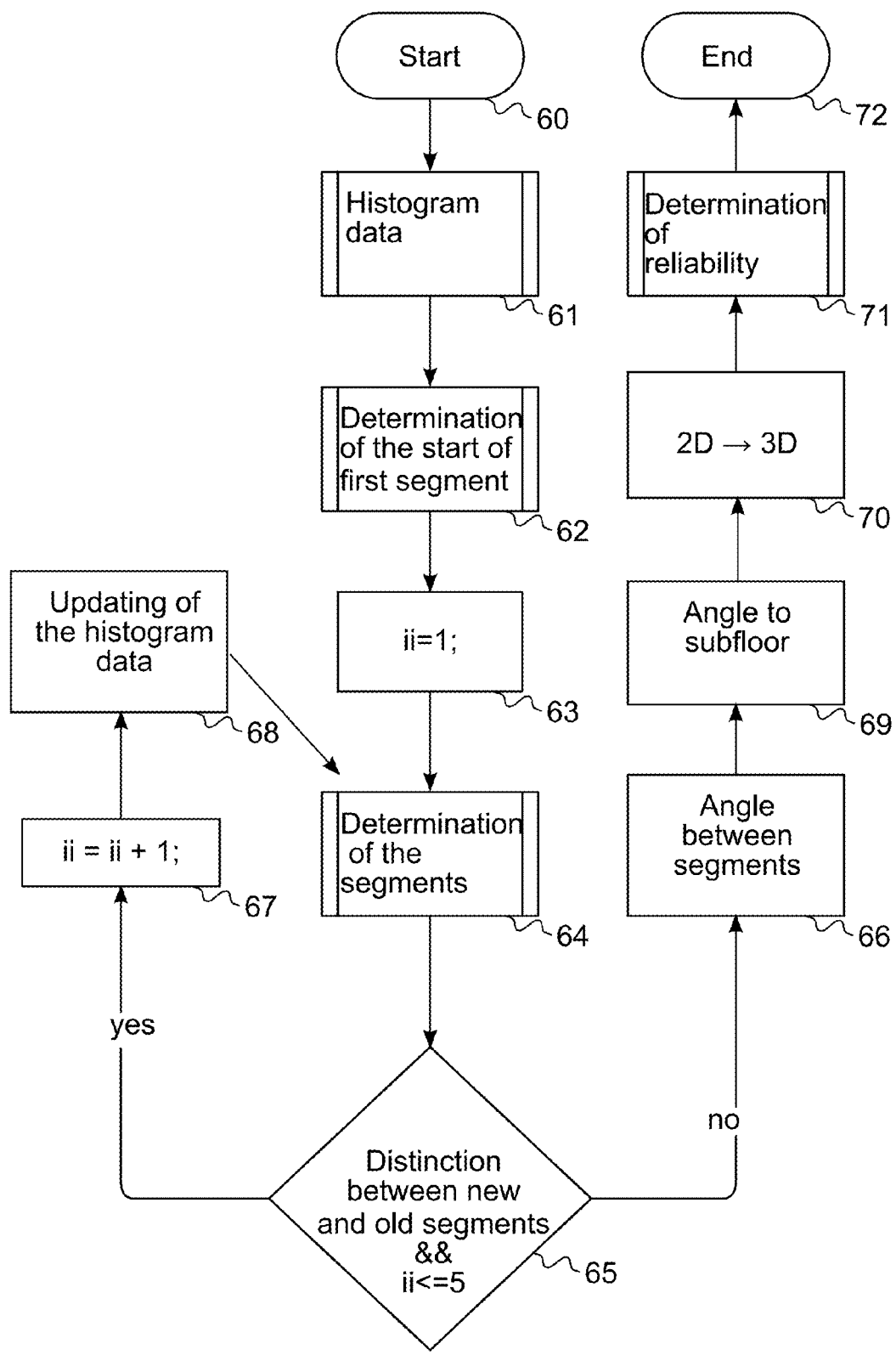
FIG. 6 is an algorithm flow chart for determining the position of the partial segments in one exemplary embodiment.

The course of the process—algorithm—shown in FIG. 6 shall be explained in more detail below. The method is based in this exemplary embodiment on three-dimensional points, i.e., coordinates of a point in space, additional information on colors and/or brightness not being absolutely necessary, so that a certain independence from the light conditions can be achieved. Should additional information be available, this can be used in exemplary embodiments to further refine the result. FIG. 6 first shows an algorithm flow chart for determining the position of the partial segments in an exemplary embodiment in an overview. The process begins in step 60 (start) downward in FIG. 6. The determination device 14 is configured in this exemplary embodiment to determine two-dimensional histogram data from at least three-dimensional partial image data of the patient positioning device 20 (a hospital bed in this case) and to determine the position of the at least two partial segments 20a, 20b, 20c, 20d of the patient positioning device 20 based on the histogram data. Such three-dimensional partial image data correspond, for example, to a set of points or point cloud, as is shown on the right side of FIG. 13. The determination of the two-dimensional histogram data is shown as step 61 in FIG. 6. Some of the processing steps explained here will be explained in detail below. In principle, the respective steps can be correspondingly adapted to different conditions and systems. Step 61 for determining the two-dimensional histogram data will be explained in more detail later with reference to FIG. 8. Such two-dimensional histogram data are shown, for example, on the right side of FIG. 10. Such two-dimensional histogram data correspond to a projection of the three-dimensional partial image data onto a lateral plane SE, which is indicated on the right side of FIG. 13. The two-dimensional histogram data contain in this case a side view of the mattress or segments 20a, 20b, 20c, 20d thereof, with pixels assigned to the mattress being highlighted.

The partial segments themselves are determined in the downward path of FIG. 6 and the information is analyzed further to obtain the result in the upward path shown on the right. The method expects as the input set of points a set of three-dimensional points, which represent a hospital bed 20 and optional interfering objects on the bed 20 here. Different sources may be used in exemplary embodiments for detecting the sets of points. The preset exemplary embodiment assumes 2.5 to 3 dimensions, with 2.5 dimensions indicating the presence of data of an at least three-dimensional partial image. The hospital bed/patient positioning device 20 itself may be any configurable hospital bed. Segmenting and classification are performed to determine the configuration of the bed. The better the image of the bed 20 is reflected in the image data, the more accurate will be the result of the analysis.

The further method for determining the position of the partial segments will now be explained. The following steps therefore pertain to the histogram data instead of to the three-dimensional pixels (data) proper. Exemplary embodiments differ as a result, for example, from model fitting methods, which are based directly on the three-dimensional pixels (data sets), e.g., ICP (Besl, 1992). The starts of the segments are first determined in the data, and the start of the first segment is determined first, cf. step 62 in FIG. 6. The further starts of the other segments can be iteratively determined with this starting point, and at least one iteration is performed in FIG. 6, cf. steps 63 and 64 in FIG. 6. It is checked after each iteration whether and by how much the newly determined segments differ from the previously determined segments, cf. step 65. If there are no essential differences, the iteration is stopped and the method is continued with the determination of additional information in step 66. If there are differences, an iteration counter is increased in step 67 and the histogram data are updated, insofar as pixels that show a deviation from the previously determined segments are replaced by newly calculated histogram data (e.g., the intensity of the old pixels is set to zero and newly calculated pixels are inserted), cf. step 68 in FIG. 6.

Objects that are placed on the hospital bed 20 may cause segments 20a, 20b, 20c, 20d to be determined as being too high or with incorrect orientation. Side rails or holding frames on the sides of the bed 20 may, for example, be folded up and cause similar effects. Pixels with high intensity, which would lead to too low a determination of the straight lines or sections can be rarely encountered under the mattress in the histogram data. The method therefore runs from top to bottom in order to find the surface of the mattress. As soon as the determined sections and/or straight lines stop changing, the additional information on the position or orientation is then determined in the steps that can be seen on the right side of FIG. 6 from bottom to top. The angles between the individual segments 20a, 20b, 20c, 20d are calculated in step 66 and the angles relative to the subfloor, which likewise play an important role in the quantification of the configuration of bed, are subsequently determined in step 69. The angles are thus determined on the basis of the histogram data. To also determine the angles in the three-dimensional image data, the straight lines and/or sections are transferred in the next step 70 from the two-dimensional space into polygons in the three-dimensional space.

The reliability of the result is determined (automatically) in the next step 71, which makes it easier for subsequent components or systems to assess the data, especially if further object determinations are performed, e.g., the position of a person on the bed, persons who enter and/or leave the image detail, etc.

Figure 7:
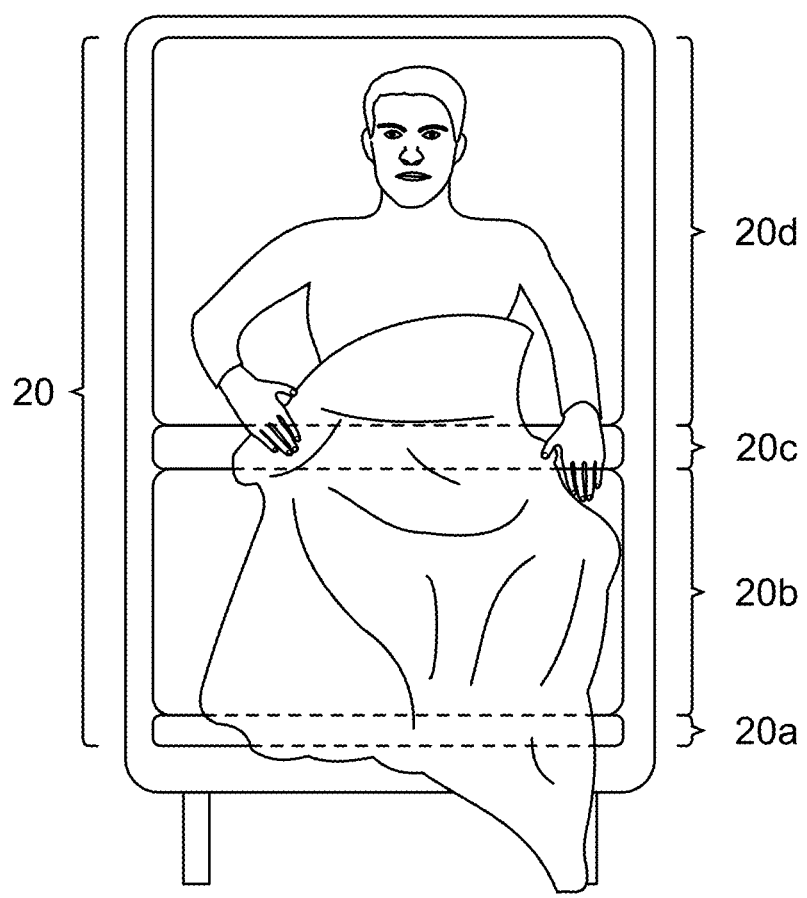
FIG. 7 is a schematic view showing detected image data in one exemplary embodiment.

An exemplary embodiment will be explained below on a picture of a typical hospital bed 20 in an intensive care unit. The partial segments 20a, 20b, 20c, 20d are greatly sloped in this case in relation to one another and the hospital bed 20 additionally has side rails. A person and a blanket, which appear in the image data as interfering objects, are lying on the bed 20. FIG. 7 illustrates image data detected in this manner in the exemplary embodiment. The data are detected with a camera, which uses structured light to detect the three-dimensional pixels. The resulting set of pixels (data set) is now in the form of an N×3 matrix, one row corresponding to a pixel in the three-dimensional space.

In addition to many possibilities of configuration of hospital beds 20, different side rails are used in intensive care units for attaching various objects and/or devices as well as diverse deposition surfaces are used. In addition, there are blankets, pillows and patients. These conditions make it difficult to determine the position directly based on the set of three-dimensional pixels and to determine which of the pixels are to be assigned to the mattress in order thus to find the configuration of the partial segments 20a, 20b, 20c, 20d. The three-dimensional pixels, which can be assigned to the bed 20 and to objects located thereon, are therefore transferred into a transformation area, which highlights the relevant points. Three properties of the pixels can be utilized:

1. Points that belong to the same partial segment, are located almost in one plane that extends at right angles to a lateral plane of the bed detail;
2. Interfering objects are often located in the center of the bed 20, e.g., a pillow on the bed. This assumption may not be true for all objects (side rails, person sitting on the side of the bed, etc.), but these objects are rather thin and cause interference on one side of the bed 20 only in the picture. This exemplary embodiment is concentrated therefore on the analysis of the image data at the sides of the bed 20; and
3. Relevant points are located above a certain height above the subfloor, because the bed shall also guarantee an efficient mode of operation for the health care staff.

Therefore, the method orders the three-dimensional image data into a weighted two-dimensional histogram, in which the points are grouped (classes or intervals of the histogram), one group corresponding to an imaginary rectangle, which is introduced into a plane whose normal vector coincides with the left-right axis of the hospital bed 20.

Figure 8:
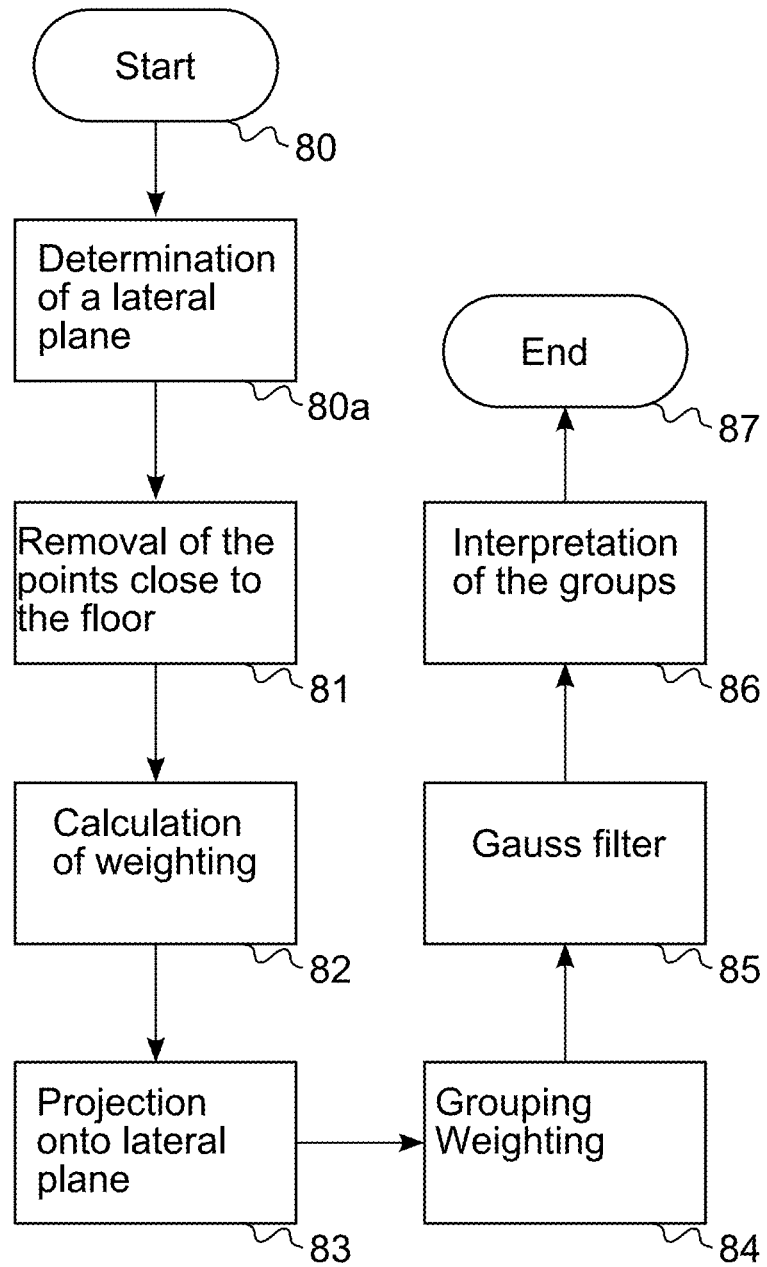
FIG. 8 is an algorithm flow chart of a transformation in one exemplary embodiment.

FIG. 8 shows an algorithm flow chart of a determination of two-dimensional histogram data from three-dimensional partial image data, as was mentioned before in reference to FIG. 6 in step 61, in an exemplary embodiment. The method starts in step 80. A lateral plane SE, shown on the right side in FIG. 13, onto which the three-dimensional partial image data can then later be projected in step 83 to determine the two-dimensional histogram data, is then determined in step 80a. This determination of the lateral plane SE will be explained later with reference to FIG. 15.

Points that are too close to the subfloor or floor are then first removed from the image data in step 81. This step corresponds to the third property above, and a distance d of the pixels above the subfloor is calculated, and pixels with d<k are discarded, and k represents a suitable threshold, e.g., 30 cm, 40 cm, 50 cm, 60 cm, etc.

Figure 9:
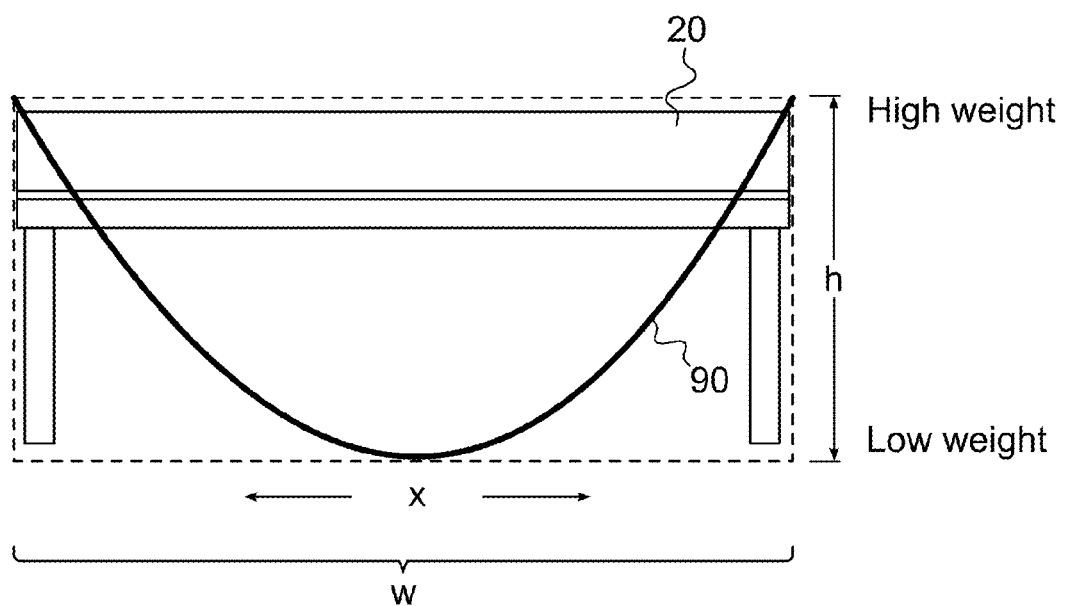
FIG. 9 is an illustration of a weighting of pixels in one exemplary embodiment.

The weighting is then calculated for the pixels in step 82. This step goes back to the second property above and takes into the account the fact that the resolution of the camera depends on the distance of the objects from the camera. The pixels (data) are weighted first according to a distance of the pixel (data) from the central plane along the longitudinal axis of the bed 20. FIG. 9 shows an illustration of a weighting of pixels (data) in an exemplary embodiment. FIG. 9 shows the hospital bed 20 in a frontal view within a rectangular detail assigned to the bed 20. The parabola 90 illustrates the weighting; points in the center are assigned lower weights than points at the edge of the bed 20 to form the histogram. The weights are then assigned to the points corresponding to the parabola shown consequently as a function of their x coordinate (x=0 exactly in the center).

The determination device 14, cf. FIGS. 1 and 5, is configured in this exemplary embodiment to determine pixels that contain image information on the patient positioning device 20 from the at least three-dimensional partial image data of the patient positioning device 20, to weight the pixels as a function of a distance from a longitudinal plane of the patient positioning device 20, and to determine the histogram data on the basis of the weighted pixels. The weighting (weight$_1$) for the individual pixels can be expressed with the following equation:

$$\text{weight}_1(x) = x^2 \cdot (2h/w^2) + h/50,$$

in which x corresponds to the x coordinate of a point, which is shown in FIG. 9 and for which the weighting shall be calculated, h corresponds to the height above the subfloor and w to the width of the bed detail. Since the pixels and their weightings shall be accumulated, cf. 84 in FIG. 8, the distance of a point from the camera can additionally also be taken into account in order to take the distance-dependent resolution into account. This can be carried out by a second weighting (weight$_2$):

$$\text{weight}_2(y) = \max(1, y \cdot \log(0.5 \cdot y)),$$

in which y corresponds to the distance of a point from the camera. The first weight (weight$_1$) can then be scaled to a value range of 0 ... 0.5 and the second weight (weight$_2$) to a value range of 0 ... 1. Their sum will then form the final weight of a pixel being considered.

The points are subsequently projected in step 83, FIG. 8, onto the lateral plane of the bed detail determined before in step 80a. It can preferably be ensured within the framework of this projection that the histogram data that represent the foot part of the bed are located in the left-hand area of the histogram rather than in the right-hand area of the histogram.

It must be known or determined for this where in the three-dimensional partial image data the foot part is located. This can be solved in different ways. A first possibility would be to provide a manual configuration of the system, in which it is specified, for example, that the foot part of the hospital bed is always located closer to a certain image sensor than the head part. Another possibility would be to use characteristic markers, which are clearly visible, for example, in the rear infrared range, as markers of the foot part, so that the position of the foot part can be determined based on a detection of the markers. Yet another possibility would be to determine the head position of a patient located in the bed by means of an automatic method and then to make it possible to infer the distinction between the head part and the foot part. A known facial recognition method, for example, the so-called Viola-Jones algorithm, Viola, Paul and Michael J. Jones, "Rapid Object Detection Using a Boosted Cascade of Simple Features," Proceedings of the 2001 IEEE Computer Society Conference on Computer Vision and Pattern Recognition, 2001, Volume 1, pp. 511-518, could be used to determine the head position.

Aside from possible limitations due to a possible manual configuration and the condition that the hospital bed 20 should be clearly visible, the hospital bed 20 may be oriented in the room and in relation to the cameras as desired.

The pixels (data) thus projected or generated in step 83 are then grouped and the respective weighting is added up in each group, cf. step 84. Rectangular details of the lateral planes are used for this and the weightings are added up for the pixels located in them. This takes into account the first property of the pixels above. Pixels (data) that can be assigned to the mattress extend in a section through the histogram. The number of points (sum of weights) in each group of the two-dimensional histogram is then interpreted in step 86 as group intensity and histogram pixel before the method ends in step 87.

Figure 10:
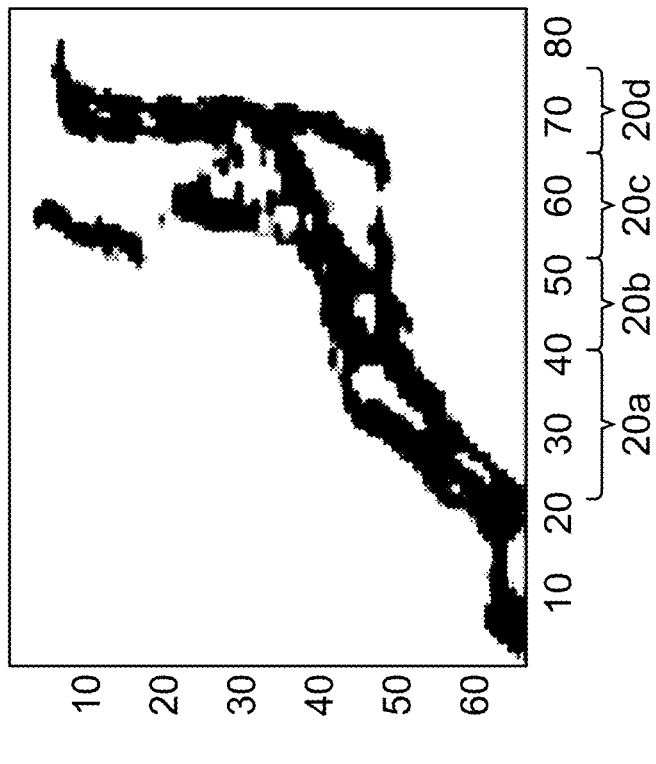
FIG. 10 is a schematic view showing an illustration of two histograms in one exemplary embodiment.
Figure 10:
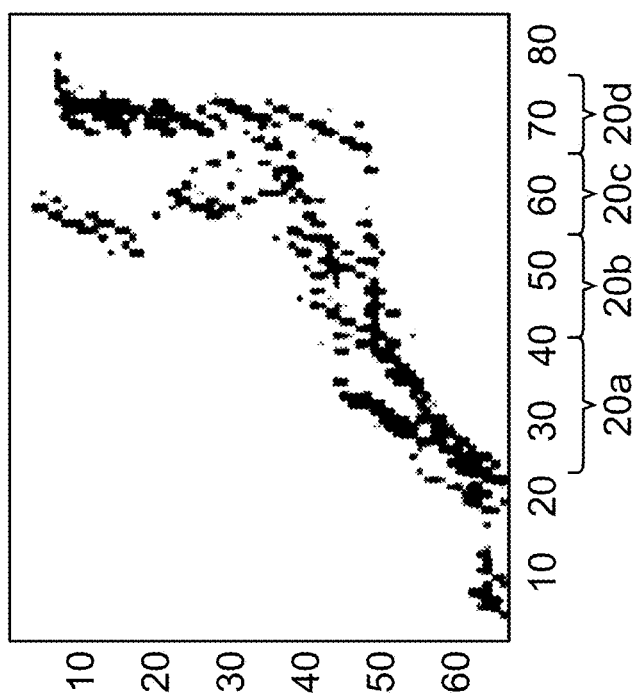

A Gauss filter can be used to smooth the histogram in step 85, as a result of which the straight lines become better recognizable. The left side of FIG. 10 shows a histogram that is based on the image data of FIG. 7 and was obtained with the above-described method. The smoothed histogram is shown on the right side of FIG. 10. The four partial segments 20*a*, 20*b*, 20*c*, 20*d* can be seen in both pictures in FIG. 10.

Figure 15:
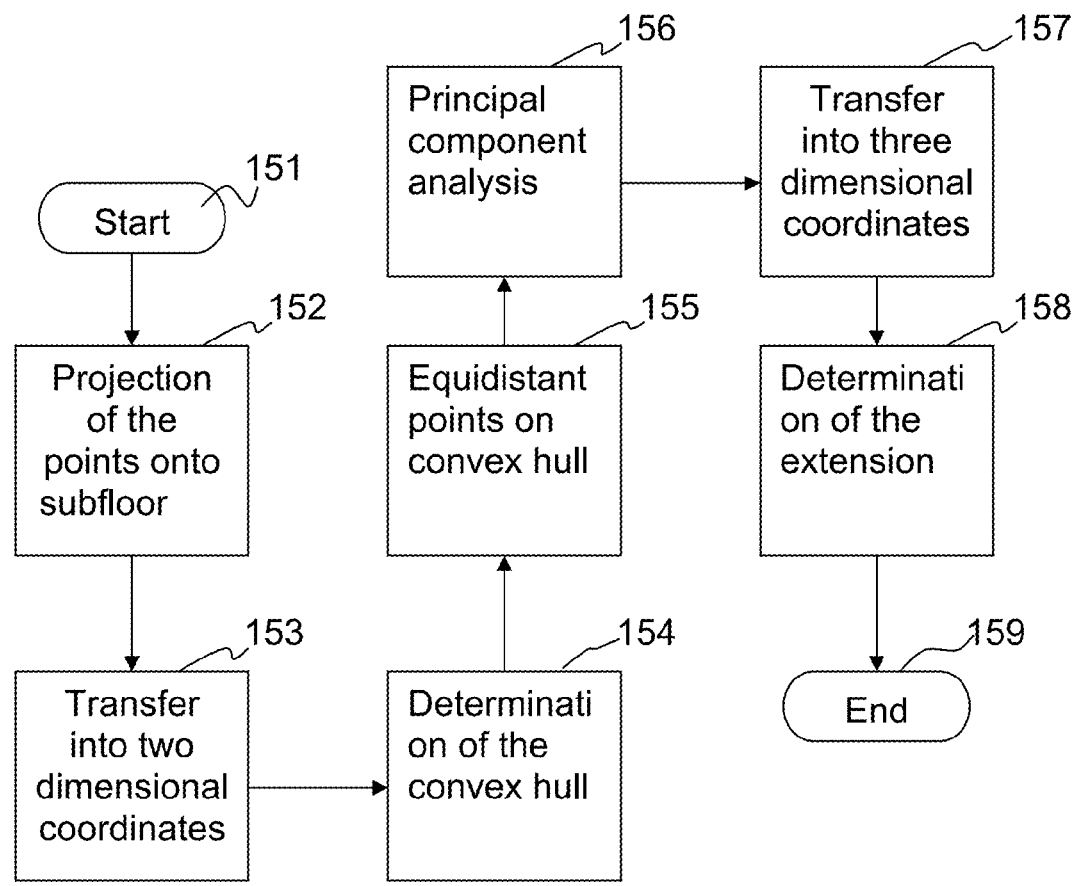
FIG. 15 is a block diagram of a flow chart of an exemplary embodiment of a method for determining a lateral plane.

How the above-mentioned lateral plane SE, shown on the right side of FIG. 13, can be determined from FIG. 8 in step 80*a* will be explained now with reference to the steps 151 through 159 shown in FIG. 15. The lateral plane SE is determined such that it extends essentially at right angles to the subfloor UG and laterally along the hospital bed. The lateral plane SE can be preset as higher knowledge, e.g., in the form of a normal vector NV1 extending at right angles to the lateral plane.

As an alternative, the lateral plane SE can be determined in an automated manner. The subfloor UG is first determined for this. The subfloor UG itself can be determined as a plane representation either automatically by means of the RANSAC algorithm, as was mentioned above. As an alternative, the information on the subfloor UG may provide higher knowledge, e.g., in the form of a plotted point AP, shown as a cross on the right side of FIG. 13, of the plane that represents the subfloor, as well as of a normal vector NV2, which extends at right angles to this plane. The information that is thus available on the subfloor UG can now be used within the framework of an automatic method, which calculates an oriented cuboid, also called Oriented Bounding Box (OBB), which encloses the set of three-dimensional points, which represent the hospital bed here. The method is based on the work of Gottschalk, > Gottschalk, Stefan, Collision queries using oriented bounding boxes. Diss. The University of North Carolina at Chapel Hill, 2000, in which it is described how an OBB can be fitted to a set of points. Alternative descriptions of such methods for determining an OBB can also be found in the documents > O'ROURKE, J., 1985. Finding minimal enclosing boxes. International Journal of Computer & Information Sciences, 14, 183-199, or
>
> LAHANAS, M., KEMMERER, T., MILICKOVIC, N., KAROUZAKIS, K., BALTAS, D., AND ZAMBOGLOU, N. 2000. Optimized bounding boxes for three-dimensional treatment planning in brachytherapy. Medical Physics, 27, 10, 2333-2342.

It can preferably be ensured here that the OBB is not oriented in the room as desired, but is always essentially at right angles to the subfloor. The above-mentioned three-dimensional partial image data or points are first projected onto the plane that describes the subfloor UG, cf. step 152 in FIG. 15. Since all points are located in a common plane now, they can also be indicated in the form of two-dimensional coordinates, cf. step 153. A convex hull is subsequently determined for these two-dimensional points in step 154 by means of the method according to Barber, > Barber, C. B., D. P. Dobkin, and H. T. Huhdanpaa, "The Quickhull Algorithm for Convex Hulls," ACM Transactions on Mathematical Software, Vol. 22, No. 4, December 1996, pp. 469-483.

Alternative descriptions of such methods for determining a convex hull can also be found in the documents > Kirkpatrick, David G.; Seidel, Raimund (1986). "The ultimate planar convex hull algorithm." SIAM Journal on Computing, 15 (1): 287-299, or
>
> Graham, R. L. (1972). An Efficient Algorithm for Determining the Convex Hull of a Finite Planar Set. Information Processing Letters, 1, 132-133.

To make the following steps more robust against peculiarities of the thorough representation of the hospital bed 20, a set of points located essentially equidistantly from one another on a hull curve and of points distributed essentially equally on the hull curve is determined in step 155. The two axes along which the points from step 155 show the greatest variance are subsequently calculated by a principal component analysis in step 156. This principal component analysis can be carried out according to the Jolliffe method, > Jolliffe, I. T. Principal Component Analysis. 2nd ed., Springer, 2002. Alternative descriptions of such methods for the principal component analysis can also be found in the documents
>
> Halko, Nathan, et al. "An algorithm for the principal component analysis of large data sets." SIAM Journal on Scientific Computing, 33.5 (2011): 2580-2594.
>
> Roweis, Sam. "EM algorithms for PCA and SPCA." Advances in neural information processing systems (1998): 626-632.

Step 157 moves the two principal axes, in the knowledge of the plane used before, which represents the subfloor UG, back into a three-dimensional representation of partial image data. Together with the normal vector of the subfloor plane, these two principal axes now form such three axes that define the desired OBB. The actual extension or limitation of the respective planes of the OBB along the respective axes defining the OBB can be determined now by means of the three-dimensional pixels or the three-dimensional partial image data. The lateral plane SE being sought corresponds to one of the planes SE, SE1, which define the OBB and are at right angles to the subfloor UG. It is irrelevant here for the later purpose of the projection whether the plane SE or SE1 is selected as the lateral plane. The planes SE and SE1 meet, further, the condition that their extension in parallel to the subfloor is greater than that of the planes SE2 or SE3. This is normally true, because the extension of a hospital bed from the foot part to the head part is greater than the extension in parallel to the foot part and the head part.

Returning to FIG. 6, the start of the first partial segment can now be found in step 62. The limitation of a foot support, which limits the bed in the lower area, can be used in this exemplary embodiment, for example, in the knowledge of the configurability of the bed used in an intensive care unit. This method is aimed at the transition between the foot support and the first mattress segment 20*a*. The foot support may appear as a vertical section or as a section dropping from left to right in the histogram, and the first segment 20*a* following this will appear horizontally or rising from left to right. The following steps can be carried out to extract these two sections:

1. Only pixels in the first 35% of the image (viewed from right to left) are considered and the other pixels are ignored (or set to zero);
2. Only those of the remaining pixels are considered, whose intensity equals at least 35% of the intensity of the median of the 15 highest occurring intensities;
3. An image skeleton, cf. Kong & Rosenfeld, 1996, can then be calculated;
4. A Hough transformation can be applied to the image skeleton in order to find a preselection of straight line and section candidates;

5. An indicator for a support or coverage, for example, the number of white pixels that are located close enough to a straight line/section determined in the preceding step, can then be determined for each straight line and section candidate; this indicator can also be used as a reliability indicator, according to which a straight line/section is selected;
6. The straight lines/sections can, further, be classified to three categories: "orthogonal," "dropping" and "other." If a sufficient number of orthogonal straight lines/sections are available, the straight lines/sections, which were classified as "dropping," can be discarded and only the orthogonal straight lines/sections located farthest to the left and close thereto will continue to be considered;
7. Two central straight lines can now be determined for the "other" groups and for the "orthogonal" group, or for the "dropping" group based on the reliability information from step 5 and/or based on the number of orthogonal straight lines/sections; and
8. The intersection of the two straight lines from the preceding step can then be used as the starting point.

Should the Hough transformation fail to produce a sufficient number of straight lines/sections in one category, the method may not lead to a result. The Hough transformation can also be repeated with modified parameters in this case. Should all attempts fail, an emergency solution can be found, for example, by setting the start position at 15% of the maximum x coordinate.

Once the histogram has been prepared and the starting point for the mattress set, the goal is to extract straight lines and/or sections, one straight line and/or section per partial segment 20a, 20b, 20c, 20d. The process of generating the histogram has the goal of highlighting pixels of the mattress against pixels of other objects (for example, objects arranged on the bed), and these other objects could still cause interference. A plurality of straight lines or combinations of straight lines are therefore used in some exemplary embodiments, sections are also additionally or alternatively sought, unusable information is discarded, and a mean value is formed from the rest. Such an exemplary embodiment is illustrated below on the basis of the algorithm flow chart in FIG. 11, which starts with step 109.

Figure 11:
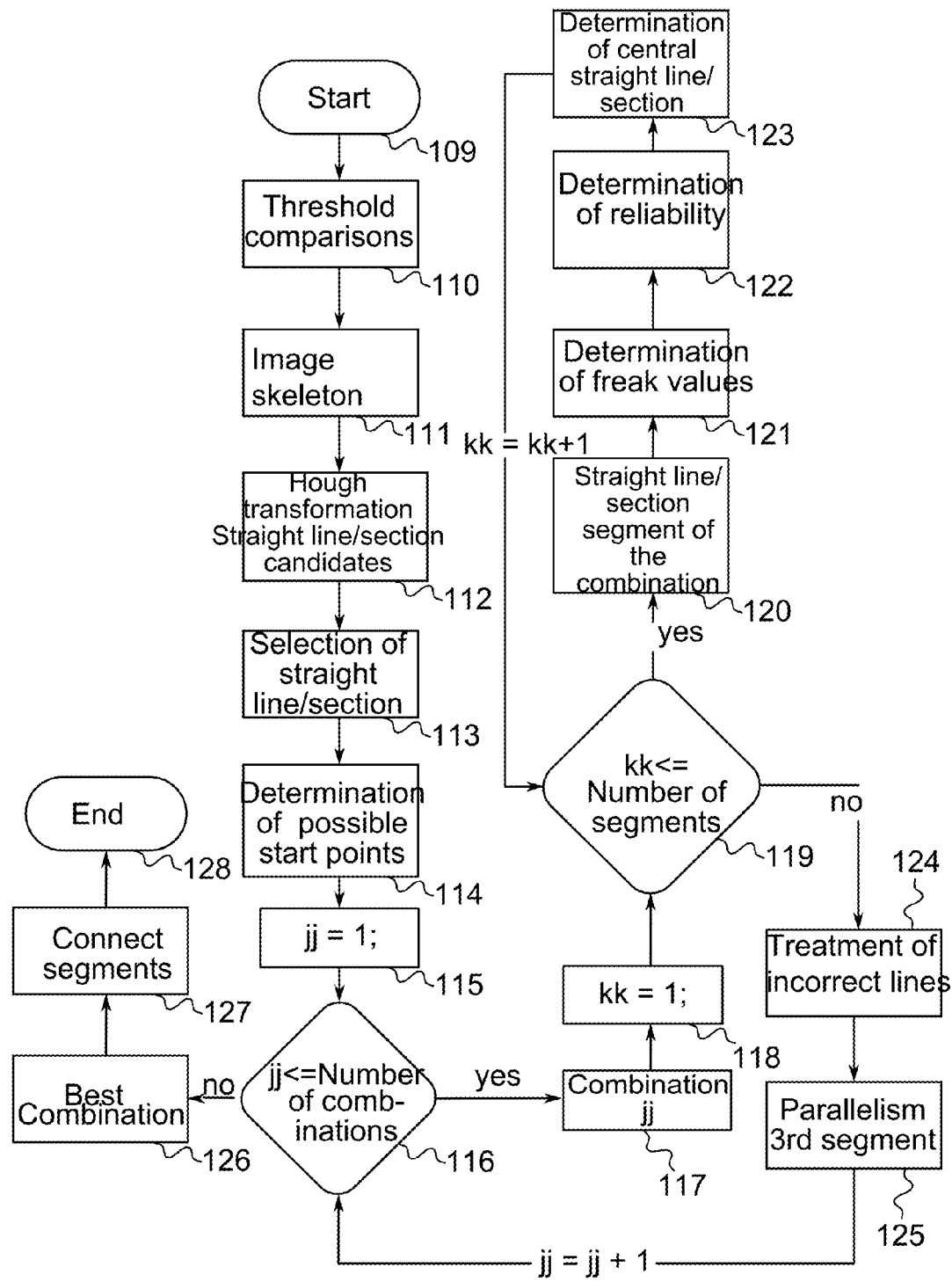
FIG. 11 is an algorithm flow chart to illustrate the adaptation of a model to mattress segments in one exemplary embodiment.

The histogram is first converted into a black-and-white image, cf. step 110 in FIG. 11, for example, by a threshold value comparison with the intention of retaining the pixels that belong to the desired straight lines or sections and of discarding others. A globally defined threshold can be found with difficulty only, because the desired pixels do not always have the highest intensity values. However, since it is known that the mattress extends from left to right in the image (along the x axis), high intensity values in a certain range of the x axis are sufficient. The image data can consequently be passed through along the x axis, and a flat area is taken into account each time, and a comparison can then be made for this area with a variable threshold. Isolated points, i.e., punctiform intensities without further connections with other pixels, can then be removed.

Figure 16:
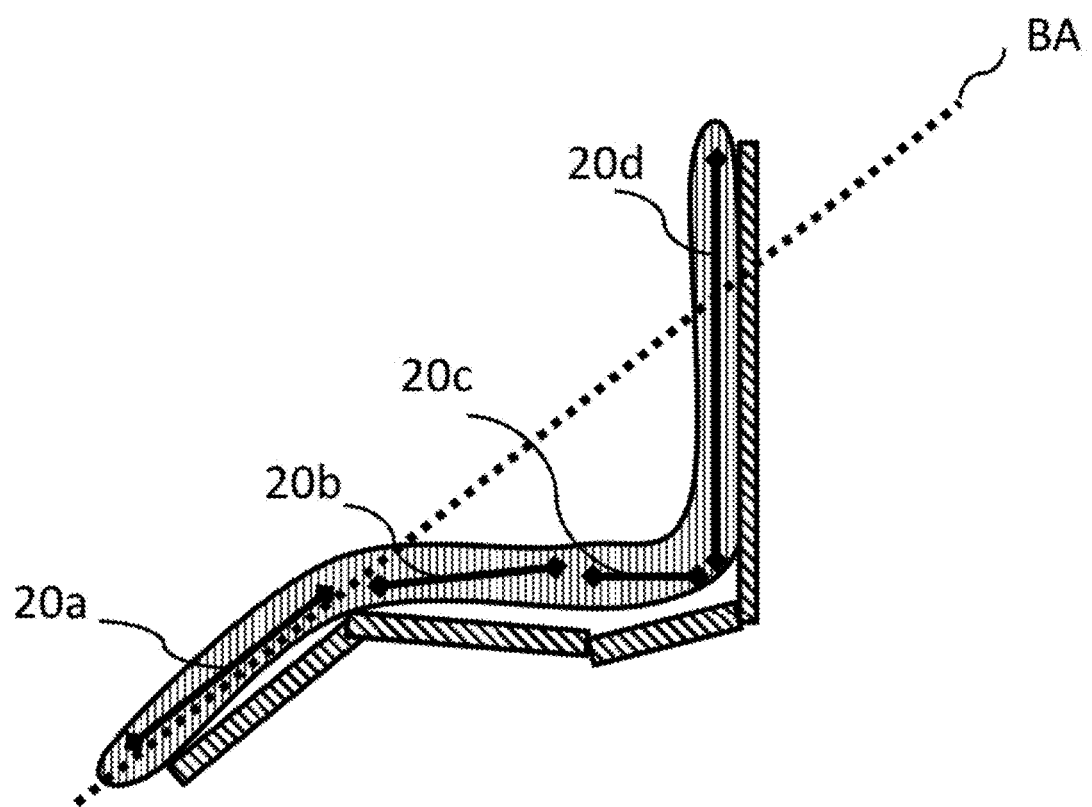
FIG. 16 is a schematic view showing an illustration of a hospital bed with partial segments and bed axis.

After the image data have been processed by the threshold values, an image skeleton can subsequently be determined, cf. step 111 in FIG. 11. Straight lines or sections can then be found in the image skeleton, for example, by means of the Hough transformation, cf. step 112. As was already described above, at least some exemplary embodiments are not aimed at finding only so many straight lines/sections, but less restrictive parameters can be used to find a plurality of straight lines/sections, which can then be filtered and averaged. Straight lines/sections, which extend at right angles to a general bed axis, can subsequently be removed according to step 113. There cannot typically be any partial segments that form an angle of 90° with the bed axis. This hypothesis is essentially correct for beds 20 in intensive care units. Such a bed axis BA is shown on the left side of FIG. 13. A bed configuration on which the left side of FIG. 13 is based is shown in FIG. 16 together with the bed axis BA. The principal component of the convex hull of the two-dimensional histogram pixels is determined as the bed axis BA by means of principal component analysis according to the Jolliffe method.

The effect of objects that are located on the bed can be weakened due to the elimination of these straight lines/sections. The partial segments 20a, 20b, 20c, 20d can then be identified. Since four segments shall be found here, four rectangular frames are arranged along the x axis, each frame having a certain extension along the x axis and comprising the entire y axis. Each frame is assumed to comprise a partial segment. Since the exact start and end points are not known, different combinations and variations may exist, from which a selection can then be made later, cf. step 114 in FIG. 11.

The following steps can then be carried out for each frame in each combination, cf. steps 115, 116, 117, 118, 119, which ensure a corresponding iteration over all combinations and the segments thereof:
1. Straight lines or sections that will fall at least partly into a frame are identified, cf. step 120;
2. Pixels (data) of the straight lines/sections located outside the frame are cut off and the length of the resulting sections is calculated/determined, cf. step 120. The sections are then extended up to the frame limits, and it is determined how many pixels the section is supported by, i.e., how many pixels are located close enough to the section (a pixel supports a section if it is located close enough to the section). The length and support of a section can then be used as a reliability indicator for the section, cf. step 122 after the determination of freak values in step 121;
3. The method may possibly also discard again extended sections as freak values. A deviation of a section from the average can be determined by comparing the start and end y coordinates of a section with the average of all sections in a frame. If the deviation from the average or mean value of a section is too high, it is discarded, cf. step 121; and
4. Taking the reliability indicators into account, an average or mean section can finally be determined or calculated per frame, cf. step 123.

These steps are carried out for each frame of the current combination, and missing segments are then treated in step 124. It is ensured in step 125 that the third segment extends essentially in parallel to the bed axis BA shown on the left side of FIG. 13 or to the subfloor UG on the right side of FIG. 13 before the iteration is continued with the next combination in step 116.

After all combinations have been treated, the best combination is selected or determined in step 126. This may take place, for example, based on two parameters:
1. The mean distance d of the determined corner points (start and end points) that are connected, and
2. The mean support s per combination.

Both parameters are then scaled to a value range of 0 . . . 1, and the combination that minimizes d+1/s is selected. The segments of the best combination are then connected as the last step 127 (taking again the reliability or support into account) before the method ends in step 128.

Figure 12:
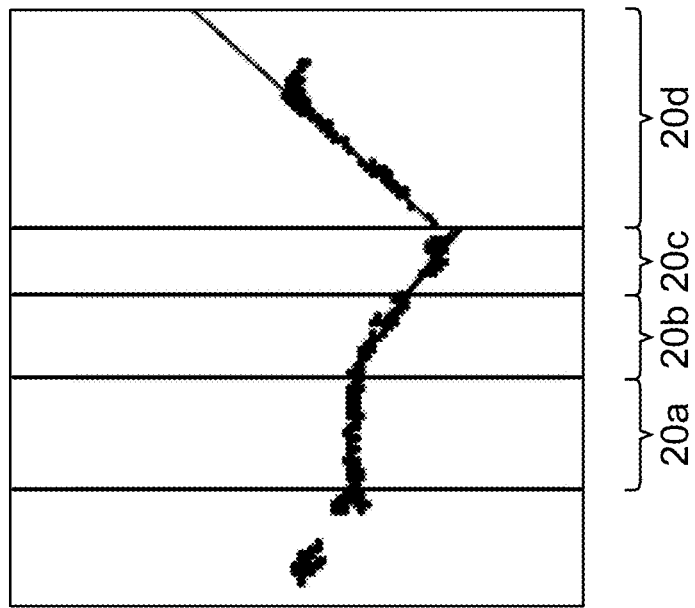
FIG. 12 is an illustration to illustrate the adaptation of a model to mattress segments in one exemplary embodiment.
Figure 12:
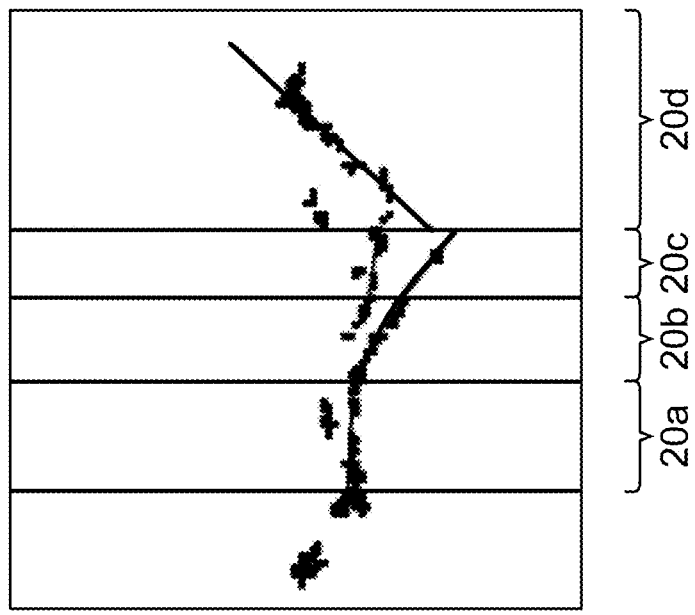

The method for determining the position of the partial segments is carried out repeatedly, as described above. FIG. 12 shows an illustration to illustrate a fitting of a model to the mattress segments 20a, 20b, 20c, 20d in the exemplary embodiment. FIG. 12 shows the interim results for the exemplary configuration in FIG. 7. The method performs two iterations now, and the histogram is shown for each iteration in FIG. 12 after the threshold value examination. The view in FIG. 12 is shown slightly rotated compared to the previous examination. FIG. 12 shows the result of the first iteration on the left side and the result of the second iteration on the right side. It can be seen that the result histogram converges better to individual sections after the second iteration than after the first iteration. Moreover, interfering pixels can be seen over the mattress proper especially on the left side of FIG. 12. The comparison of the two views in FIG. 12 shows how the effect of the interfering objects is reduced over the iteration.

The method is then continued by transferring the straight lines and/or sections found into a result image, cf. step 70 in FIG. 6. FIG. 13 shows a view of result data in one exemplary embodiment, the histogram on the left and the imaging into the three-dimensional area on the right. The left side of FIG. 13 shows, moreover, on the basis of the histograms, the determined relative angles of the segments 20a, 20b, 20c, 20d among one another (on a white background) and the angles to the subfloor (with black background). The segments 20a, 20b, 20c, 20d are shown as black sections. The right side of the view shows the imaging of the segments 20a, 20b, 20c, 20d onto polygons in the three-dimensional view in the three-dimensional set of points. The four segments 20a, 20b, 20c, 20d in the order from the foot part to the head part have the determined angles (38°, 6°, 0°, 90°) relative to the subfloor. The angles between the segments 20a, 20b, 20c, 20d equal (148°, 174°, 90°).

Finally, the method being described here also determines a reliability indicator for the determined result, cf. 71 in FIG. 6. The method estimates the reliability of the determined configuration of the patient positioning device 20. In general, a higher reliability is determined if the mattress is clearly recognizable in the histogram and is not hidden by interfering objects, which may adversely affect the result. Since the threshold value decision is aimed at retaining pixels that can be assigned to the mattress and to discard others, it can be checked how well the determined result segments agree with the non-discarded pixels. If the agreement is relatively good, this is a sign that the mattress was readily recognizable in the data. If not, this is a sign that interfering objects were probably present on the mattress or in the image between the sensor and the mattress. The mattress can still elicit a sufficient number of pixels to obtain a good result in this case as well.

The iterative method is aimed, among other things, at discarding interfering objects or pixels (data), which go back to interfering objects. To assess how well the discarding of these pixels functions, it is also possible to use the fitting together of the segments 20a, 20b, 20c, 20d with the result image (e.g., that in which the pixels over the intermediate segments were discarded, cf. FIG. 12).

For example, the reliability indicator can be calculated in an automated manner as follows:
1. Calculation of the support for the sections for each segment 20a, 20b, 20c, 20d in the original histogram ($support_1$);
2. Repetition of the first step with the modified histogram after all iterations, which are carried out during the fitting process ($support_2$); and
3. Determination of a potential "maximum" support for each partial segment 20a, 20b, 20c, 20d (maxSupport).

The reliability indicator can then be calculated, e.g., as $$0.5 \cdot \frac{1}{N} \cdot \left( \sum_{i=1}^{N} \frac{support_1(i) + support_2(i)}{maxSupport_1(i)} \right)$$

in which N corresponds to the number of segments. If the quality or reliability is high, the probability of a result closely fitting reality is correspondingly high. A low quality or reliability valve does not necessarily mean poor agreement, but the probability of a poor agreement rises with decreasing quality or reliability value. In this exemplary embodiment, $support_1$=(16, 16, 3, 15), $support_2$=(20, 17, 9, 24) and maxSupport=(21, 18, 16, 43). The resulting reliability or quality indicator is therefore $$0.5 \cdot \frac{1}{4} \cdot \left( \frac{36}{21} + \frac{33}{18} + \frac{12}{16} + \frac{39}{43} \right) = 0.6506.$$

Exemplary embodiments may have different applications, for example, in nursing and health care as well as in computer-aided optical detection. For example, documentation of the patient positions or postures, which is usually performed manually, is expected from the health care and nursing staff especially in intensive care units. These positions or postures shall be regularly changed under corresponding circumstances in order to prevent decubitus ulcers or bedsores of the patient, and a complete as well as regular documentation may be significant here, precisely also in order to possibly prove countermeasures in case decubitus ulcers nevertheless developed. The steady updating of the documentation may be laborious and tiresome for the staff, especially because the efficiency of the other nursing and care activities may suffer in the process. Exemplary embodiments may make possible an automated detection and automated documentation here and thus favorably affect or facilitate the work process for the staff, the regularity of the documentation and/or also the quality of data acquisition. Exemplary embodiments can determine or estimate the configuration of the patient positioning device 20 and can thus be used, for example, in hospitals or patient care facilities.

Similarly to the documentation, exemplary embodiments may make possible a warning system, for example, to alarm the staff if the configuration of the patient positioning device 20 has not changed over a certain time. Exemplary embodiments may provide, e.g., a general contactless warning system, which contributes to the avoidance of decubitus ulcers and for which no special hospital bed equipped with sensors is necessary.

Some exemplary embodiments can forward the information on the configuration of the patient positioning device to a display unit, e.g., a monitor, a display, etc. This can offer the possibility of monitoring the configuration of the bed from the outside in environments that are critical in respect to hygiene or in isolation scenarios. Even a manual documentation can then be made possible from the outside by the staff in the patient files without the critical area having to be entered and the patient positioning device 20 being looked at by the staff.

An automatic segmenting of a three-dimensional scene into separate objects may be a difficult task if only a small number of information channels is available. The obtaining of additional information on an already found object (e.g., a bed) may be helpful for systems in order to take into account the presence or position/location of additional objects (e.g., a person, who is sitting on the bed). Exemplary embodiments can determine the position of the patient positioning device 20 together with the three-dimensional position of the segments 20a, 20b, 20c, 20d, and the following analyses can take this information into account in the analysis of additional pixels, which are located, e.g., over the segments 20a, 20b, 20c, 20d.

Exemplary embodiments can thus offer a possibility of equipping patient positioning devices 20 that have no sensor systems or a detection possibility of their own for the segment positions themselves. This expansion may also be carried out in a largely cost-effective manner, because a plurality of patient positioning devices 20 may also be monitored by one device 10. Moreover, exemplary embodiments may be less complicated in terms of the cleaning and care of the system than cabled systems, because exemplary embodiments do not have to be arranged in the immediate vicinity of the patient positioning device 20.

Figure 14:
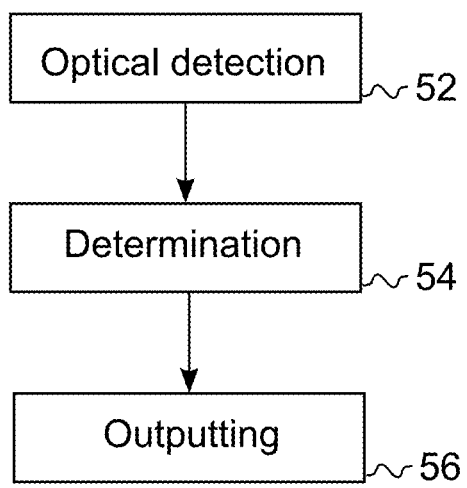
FIG. 14 is a block diagram of an exemplary embodiment of a flow chart of a method for determining the position of at least two partial segments of a patient positioning device.

FIG. 14 illustrates a block diagram of a flow chart of a method for determining the position of at least two partial segments 20a, 20b, 20c, 20d of a patient positioning device 20. The method comprises the optical detection 52 of image data of the patient positioning device 20 and the determination 54 of the position of the at least two partial segments 20a, 20b, 20c, 20d of the patient positioning device 20 based on the optically detected image data. The method comprises, furthermore, the outputting 56 of information on the position of the at least two partial segments 20a; 20b; 20c; 20d.

Another exemplary embodiment is a program or computer program with a program code for carrying out one of the above-described methods when the program code is executed on a computer, a processor or a programmable hardware component.

The features disclosed in the above description, the claims and the drawings may be significant for the embodying of exemplary embodiments in their different configurations both individually and in any desired combination and, unless specified otherwise in the description, they may be combined with one another as desired.

Even though some aspects were described in connection with a device, it is obvious that these aspects also represent a description of the corresponding method, so that a block or a component of a device can also be defined as a corresponding method step or as a feature of a method step. Analogously hereto, aspects that were described in connection with one method step or as a method step also represent a description of a corresponding block or detail or feature of a corresponding device.

Depending on certain implementation requirements, exemplary embodiments of the present invention may be implemented in hardware or in software. The implementation may be carried out with the use of a digital storage medium, for example, a floppy disk, a DVD, a Blu-Ray disc, a CD, a ROM, a PROM, an EPROM, an EEPROM or a FLASH memory, a hard drive or another magnetic or optical memory, on which electronically readable control signals, which can or do interact with a programmable hardware component such that the respective method is executed, are stored.

A programmable hardware component may be formed by a processor, a computer processor (CPU=Central Processing Unit), a graphics processor (GPU=Graphics Processing Unit), a computer, a computer system, an application-specific integrated circuit (ASIC=Application-Specific Integrated Circuit), an integrated circuit (IC=Integrated Circuit), an SOC (=System on Chip), a programmable logic element or a field-programmable gate array with a microprocessor (FPGA=Field Programmable Gate Array).

The digital storage medium may therefore be machine- or computer-readable. Some exemplary embodiments consequently comprise a data storage medium, which has electronically readable control signals, which are capable of interacting with a programmable computer system or with a programmable hardware component such that one of the methods being described here is executed. An exemplary embodiment is thus a data storage medium (or a digital storage medium or a computer-readable medium), on which the program for executing the methods being described here is recorded.

Exemplary embodiments of the present invention may be implemented, in general, as programs, firmware, computer program or computer program product with a program code or as data, wherein the program code or the data is/are active in order to execute one of the methods when the program is running on a processor or a programmable hardware component. The program code or the data can also be stored, for example, on a machine-readable medium or data storage medium. The program code or the data may be present, among other things, as source code, machine code or byte code as well as as other intermediate code.

Another exemplary embodiment is, further, a data stream, a signal sequence or a sequence of signals, which represents/represent the program for executing one of the methods being described here. The data stream, the signal sequence or the sequence of signals may be configured, for example, for being transferred via a data communication connection, for example, via the Internet or another network. Exemplary embodiments are thus also signal sequences representing data, which are suitable for transmission via a network or a data communication link, wherein the data represent the program.

A program according to an exemplary embodiment may implement one of the methods during an execution, for example, by this program reading storage locations or by a datum or a plurality of data being written into said storage locations, as a result of which switching operations or other operations are possibly induced in transistor structures, in amplifier structures or in other electrical, optical, magnetic components or components operating according to another principle of operation. Data, values, sensor values or other information can correspondingly be detected, determined or measured by a program by reading a storage location. A program can therefore detect, determine or measure variables, values, measured variables and other information by reading one or more storage locations as well as cause, induce or execute an action by writing into one or more storage locations as well as actuate other devices, machines and components.

The above-described exemplary embodiments represent only an illustration of the principles of the present invention. It is obvious that modifications and variations of the arrangements and details being described here will be clear to other persons skilled in the art. Therefore, the present invention is intended to be limited only by the scope of protection of the following patent claims rather than by the specific details, which are presented here on the basis of the description and the explanation of the exemplary embodiments.

While specific embodiments of the invention have been shown and described in detail to illustrate the application of the principles of the invention, it will be understood that the invention may be embodied otherwise without departing from such principles.

What is claimed is:

1. An optical image data acquisition and position determination device for detecting an optical image providing optical image data of a patient positioning device comprising a plurality of partial segments each having a segment extent with a segment position relative to each other and for determining a position of at least two partial segments of the patient positioning device based on the image data, the device comprising:
   an optical image data input receiving optical image data comprising at least three-dimensional partial image data of the patient positioning device;
   an interface for outputting information on the position of the at least two partial segments; and
   a determination device configured to determine two-dimensional partial image data from the at least three-dimensional partial image data of the patient positioning device and configured to determine the segment position of the segment extent of one of the at least two partial segments of the patient positioning device and to determine the position of the segment extent of another of the at least two partial segments of the patient positioning device based on the two-dimensional partial image data, wherein:
   the determination device is configured to determine two-dimensional histogram data as the two-dimensional partial image data from the at least three-dimensional partial image data of the patient positioning device and to determine the position of the at least two partial segments of the patient positioning device based on the histogram data; and
   the interface outputs the position of the at least two partial segments of the patient positioning device based on the histogram data.

2. A device in accordance with claim 1, wherein the determination device is configured to determine information on reliability of a position determination for at least one partial segment.

3. A device in accordance with claim 1, wherein the interface is configured, further, to output position information or to output size information or to output both position information and size information on the at least two partial segments.

4. A device in accordance with claim 1, wherein for the transforming of the image data the determination device is configured to determine pixels, which have image information on the patient positioning device, from the at least three-dimensional partial image data of the patient positioning device, to weight the pixels as a function of a distance from a central plane along a longitudinal axis of the patient positioning device, and to determine the histogram data on the basis of the weighted pixels.

5. A device in accordance with claim 1, wherein the determination device is configured to output information on the position of the at least two partial segments of the patient positioning device as a function of a condition.

6. A device in accordance with claim 5, wherein the determination device receives a selection input whereby the condition is selected such that the output takes place one of periodically, on request, in an event-based manner or at random.

7. A device in accordance with claim 1, further comprising a detection device for detecting an optical image and generating the optical image data of the patient positioning device, wherein the detection device comprises at least one sensor operatively connected to the optical image data input.

8. A device in accordance with claim 7, wherein the at least one sensor comprises a three-dimensional data sensor, which delivers at least three-dimensional data.

9. A device in accordance with claim 7, wherein the at least one sensor is configured to detect the image and generate a set of pixels as the image data that is essentially independent from an illumination intensity of the patient positioning device and wherein the illumination intensity of the patient positioning device is based on an effect of one or more external light sources.

10. A device in accordance with claim 1, wherein the determination device is configured to transform the image data or preprocessed image data from an original data set into a transformation data set, wherein a determination of the position of the partial segments is less affected by interfering objects in the image data in the transformation data set than in the original data set.

11. A device in accordance with claim 10, wherein the determination device is configured to quantify the at least two partial segments in the transformation data set in terms of position and size.

12. A device in accordance with claim 10, further comprising a detection device for detecting an optical image and generating the optical image data of the patient positioning device, wherein:
   the detection device comprises a plurality of image sensors for detecting at least three-dimensional partial image data; and
   the determination device is configured to combine the data of the plurality of image sensors into image data of an at least three-dimensional partial image of the patient positioning device to provide the at least three-dimensional partial image data and to carry out the determination of the position of the at least two partial segments on the basis of the partial image.

13. An optical image data acquisition and position determination device for determining positions of a plurality of partial segments of a patient positioning device based on image data, the device comprising:
   an optical image data input receiving optical image data comprising at least three-dimensional partial image data of the patient positioning device;
   a determination device configured:
      to determine two-dimensional partial image data from the at least three-dimensional partial image data of the patient positioning device; and
      to determine a position of a segment extent of a first partial segment of the at least two partial segments of the patient positioning device based on the two-dimensional partial image data and to determine a position of a segment extent of a second partial segment of the at least two partial segments of the patient positioning device, distinguishing between the first partial segment and the second partial segment, based on the two-dimensional partial image data; and
   an interface outputting information on the position of the segment extent of the first partial segment and the position of the segment extent of a second partial segment, wherein each of the segment extent of a first partial segment and the segment extent of the second partial segment are identified as part of the position determination based on identifying a plurality of straight lines or straight sections in the two-dimensional partial image data with one of the identified straight lines or straight sections corresponding to the first partial segment and one of the identified straight lines or straight line sections corresponding to the second partial segment and the interface outputs the position of the segment extent of the first partial segment and the position of the segment extent of a second partial segment based on the identified straight lines or straight sections corresponding to the first partial segment and based on the identified straight lines or straight sections corresponding to the second partial segment.

14. An optical image data acquisition and position determination device according to claim 13, wherein a size and a position of the identified straight lines or straight sections is quantified as a part of determining the position of the segment extent of the first partial segment and the determining of the position of the segment extent of the second partial segment.

15. An optical image data acquisition and position determination device according to claim 13, further comprising a detection device for detecting an optical image and generating the optical image data of the patient positioning device, wherein the detection device comprises at least one sensor operatively connected to the optical image data input.

16. An optical image data acquisition and position determination device for determining positions of a plurality of partial segments of a patient positioning device based on image data, the device comprising:
   an optical image data input receiving optical image data comprising at least three-dimensional partial image data of the patient positioning device;
   a determination device configured:
      to determine two-dimensional partial image data from the at least three-dimensional partial image data of the patient positioning device; and
      to determine a position of a segment extent of a first partial segment of the at least two partial segments of the patient positioning device based on the two-dimensional partial image data and to determine a position of a segment extent of a second partial segment of the at least two partial segments of the patient positioning device, distinguishing between the first partial segment and the second partial segment, based on the two-dimensional partial image data, wherein the determination device is configured to determine two-dimensional histogram data as the two-dimensional partial image data from the at least three-dimensional partial image data of the patient positioning device and to determine the position of the at least two partial segments of the patient positioning device based on the histogram data; and
   an interface outputting information on the position of the segment extent of the first partial segment determined based on the histogram data and the position of the segment extent of a second partial segment determined based on the histogram data.

17. An optical image data acquisition and position determination device according to claim 16, wherein the determination device is configured to transform the image data or preprocessed image data from an original data set into a transformed data set wherein a data contribution of interfering objects is less in the transformed data set a data than a contribution of interfering objects is in the original data set whereby a determination of the position of the partial segments is less affected by interfering objects in the image data in the transformation data set than in the original data set.

18. An optical image data acquisition and position determination device according to claim 17, wherein:
   for the transforming of the image data, the determination device is configured to determine pixels, which have image information on the patient positioning device, from the at least three-dimensional partial image data of the patient positioning device, to weight the pixels as a function of a distance from a central plane along a longitudinal axis of the patient positioning device, and to determine the histogram data on the basis of the weighted pixels.

* * * * *